US011887536B2

(12) United States Patent
Son et al.

(10) Patent No.: US 11,887,536 B2
(45) Date of Patent: Jan. 30, 2024

(54) PIXEL CIRCUIT AND DISPLAY DEVICE INCLUDING THE SAME

(71) Applicant: LG Display Co., Ltd., Seoul (KR)

(72) Inventors: Ki Min Son, Paju-si (KR); Chang Hee Kim, Paju-si (KR); Seok Noh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/859,940

(22) Filed: Jul. 7, 2022

(65) Prior Publication Data

US 2023/0029234 A1 Jan. 26, 2023

(30) Foreign Application Priority Data

Jul. 8, 2021 (KR) ........................ 10-2021-0089996
Dec. 2, 2021 (KR) ........................ 10-2021-0170672
May 18, 2022 (KR) ........................ 10-2022-0060579

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01); *G09G 2300/0852* (2013.01); *G09G 2320/0233* (2013.01); *G09G 2320/0247* (2013.01); *G09G 2330/021* (2013.01)

(58) Field of Classification Search
None
See application file for complete search history.

(56) References Cited

U.S. PATENT DOCUMENTS 11,211,013 B2 12/2021 Kim et al.
2013/0043802 A1 2/2013 Han et al.
2016/0379552 A1* 12/2016 Kim .................... G09G 3/3233 345/76

(Continued)

FOREIGN PATENT DOCUMENTS

CN 111179820 A 5/2020
CN 111383598 A 7/2020

(Continued)

OTHER PUBLICATIONS

Office Action, dated Jul. 18, 2023, for Japanese Patent Application No. 2022-109512. (4 pages).

*Primary Examiner* — Matthew Yeung
(74) *Attorney, Agent, or Firm* — Seed IP Law Group LLP

(57) ABSTRACT

A pixel circuit comprises a first switch element comprising a first electrode to which an initialization voltage is applied, a gate electrode to which a initialization pulse is applied, and a second electrode connected to a second node; a second switch element comprising a first electrode connected to a third node or a fourth node, a gate electrode to which a sensing pulse is applied, and a second electrode to which a reference voltage is applied; a third switch element comprising a first electrode to which a data voltage is applied, a gate electrode to which a scan pulse is applied, and a second electrode connected to the second node; and a fourth switch element comprising a first electrode connected to the third node, a gate electrode to which a first emission control pulse is applied, and a second electrode connected to the fourth node.

10 Claims, 34 Drawing Sheets

(56) References Cited

U.S. PATENT DOCUMENTS

| | | | |
|---|---|---|---|
| 2017/0186782 | A1 | 6/2017 | Lee et al. |
| 2018/0108295 | A1* | 4/2018 | Ebisuno .............. H01L 27/1255 |
| 2020/0005709 | A1* | 1/2020 | Kim ..................... H10K 59/124 |
| 2021/0125560 | A1 | 4/2021 | Park et al. |
| 2022/0122531 | A1 | 4/2022 | Zheng |
| 2022/0180812 | A1 | 6/2022 | Lin et al. |

FOREIGN PATENT DOCUMENTS

| | | | |
|---|---|---|---|
| CN | 112712773 | A | 4/2021 |
| CN | 112970055 | A | 6/2021 |
| JP | 2020112795 | A | 7/2020 |
| KR | 10-2020-0078246 | A | 12/2018 |
| KR | 10-2020-0111324 | A | 3/2019 |
| KR | 10-2021-0031582 | A | 9/2019 |

* cited by examiner

PIXEL CIRCUIT AND DISPLAY DEVICE INCLUDING THE SAME

CROSS-REFERENCE TO RELATED APPLICATION

This application claims priority to and the benefit of Korean Patent Application No. 10-2021-0089996, filed on Jul. 8, 2021, Korean Patent Application No. 10-2021-0170672, filed on Dec. 2, 2021, and Korean Patent Application No. 10-2022-0060579, filed on May 18, 2022, the disclosure of which is incorporated herein by reference in its entirety.

BACKGROUND

Technical Field

The present disclosure relates to a pixel circuit and a display device including the same.

Description of the Related Art

An electroluminescence display device may be divided into an inorganic light emitting display device and an organic light emitting display device according to the material of the emission layer. The active matrix type organic light emitting display device includes an organic light emitting diode (hereinafter, referred to as "OLED") that emits light by itself, and has the advantage of fast response speed, high light-emitting efficiency, high luminance and wide viewing angle. In the organic light emitting display device, the OLED (Organic Light Emitting Diode) is formed in each pixel. The organic light emitting display device has a fast response speed, excellent light-emitting efficiency, luminance, and viewing angle, and has also excellent contrast ratio and color reproducibility because black gray scale can be expressed as complete black.

A pixel circuit of a field emission display device includes an organic light-emitting diode (OLED) used as a light-emitting element and a driving element for driving the OLED.

The anode electrode of the OLED can be connected to the source electrode of the driving element, and the cathode electrode of the OLED can be connected to a low-potential voltage source. The low-potential voltage source can be commonly connected to the pixels. In this case, the gate-source voltage of the driving element can change when the low-potential voltage source fluctuates or due to the influence of the OLED, resulting in deterioration of image quality. Since the current flowing through the OLED is determined according to the gate-source voltage of the driving element, a change in the gate-source voltage of the driving element causes a change in the luminance of the OLED. Due to the parasitic capacitance existing between a data line to which a data voltage is applied and the low-potential voltage source, ripples may occur in the low-potential voltage source when the change in the data voltage is large. As a result, crosstalk may be induced between pixel lines whose data voltages change, causing dark lines or bright lines to appear on the screen.

BRIEF SUMMARY

The present disclosure provides a pixel circuit in which the gate-source voltage Vgs of a driving element is not affected by changes in a low-potential voltage source. The pixel circuit includes a light-emitting element. The present disclosure also provides for a display device including the same.

According to one embodiment, a pixel circuit includes: a driving element comprising a first electrode connected to a first node to which a pixel driving voltage is applied, a gate electrode connected to a second node, and a second electrode connected to a third node; a light-emitting element comprising an anode electrode connected to a fourth node and a cathode electrode to which a low-potential power supply voltage is applied; a first switch element comprising a first electrode to which an initialization voltage is applied, a gate electrode to which an initialization pulse is applied, and a second electrode connected to the second node, and configured to supply the initialization voltage to the second node in response to the initialization pulse; a second switch element comprising a first electrode connected to the third node or the fourth node, a gate electrode to which a sensing pulse is applied, and a second electrode to which a reference voltage is applied, and configured to supply the reference voltage to the third node or the fourth node in response to the sensing pulse; a third switch element comprising a first electrode to which a data voltage is applied, a gate electrode to which a scan pulse is applied, and a second electrode connected to the second node, and configured to supply the data voltage to the second node in response to the scan pulse; and a fourth switch element comprising a first electrode connected to the third node, a gate electrode to which a first emission control pulse is applied, and a second electrode connected to the fourth node, and configured to connect the third node to the fourth node in response to the first emission control pulse.

According to one embodiment, a display device includes: a display panel on which a plurality of data lines, a plurality of gate lines intersecting the data lines, a plurality of power lines to which different constant voltages are applied, and a plurality of subpixels are disposed; a data driver configured to supply a data voltage of pixel data to the data lines; and a gate driver configured to supply an initialization pulse, a sensing pulse, and an emission control pulse to the gate lines.

Each of the subpixels comprises the pixel circuit.

A method of driving a light emitting element is also disclosed. According to this method, a high voltage is provided to a first terminal of a drive transistor at the same time that an initialization voltage is provided to a gate of the drive transistor during a first time period. During this time period, a first terminal of the light emitting element is electrically isolated from a second terminal of the drive transistor. A data signal that contains light emission data is provided to a gate of the drive transistor during a second time period. The first terminal of the light emitting element remains electrically isolated from the second terminal of the drive transistor during the second time period. The voltage on the gate of the drive transistor is boosted during a third time period. The first terminal of the light emitting element is electrically connected to the second terminal of the drive transistor during the third time period. Light is emitting from the light emitting element after the boosting is occurs, which is during a fourth time period.

In one embodiment, a sense signal is provided to the gate of sense switching transistor during both the first and the second time periods, the sense switching transistor having a first terminal electrically connected to the first terminal light emitting element.

In another embodiment, the second terminal of the drive transistor is electrically connected to the first terminal of the light emitting element during an initialization time period that is prior to the first time period.

The drawbacks which this disclosure addresses are not limited to the aforementioned ones, but other drawbacks which can be solved by this disclosure will become apparent to those skilled in the art from the description below.

BRIEF DESCRIPTION OF THE SEVERAL VIEWS OF THE DRAWINGS

The above and other objects, features and advantages of the present disclosure will become more apparent to those skilled in the art by describing exemplary embodiments thereof in detail with reference to the accompanying drawings, in which.

DETAILED DESCRIPTION

Figure 1:
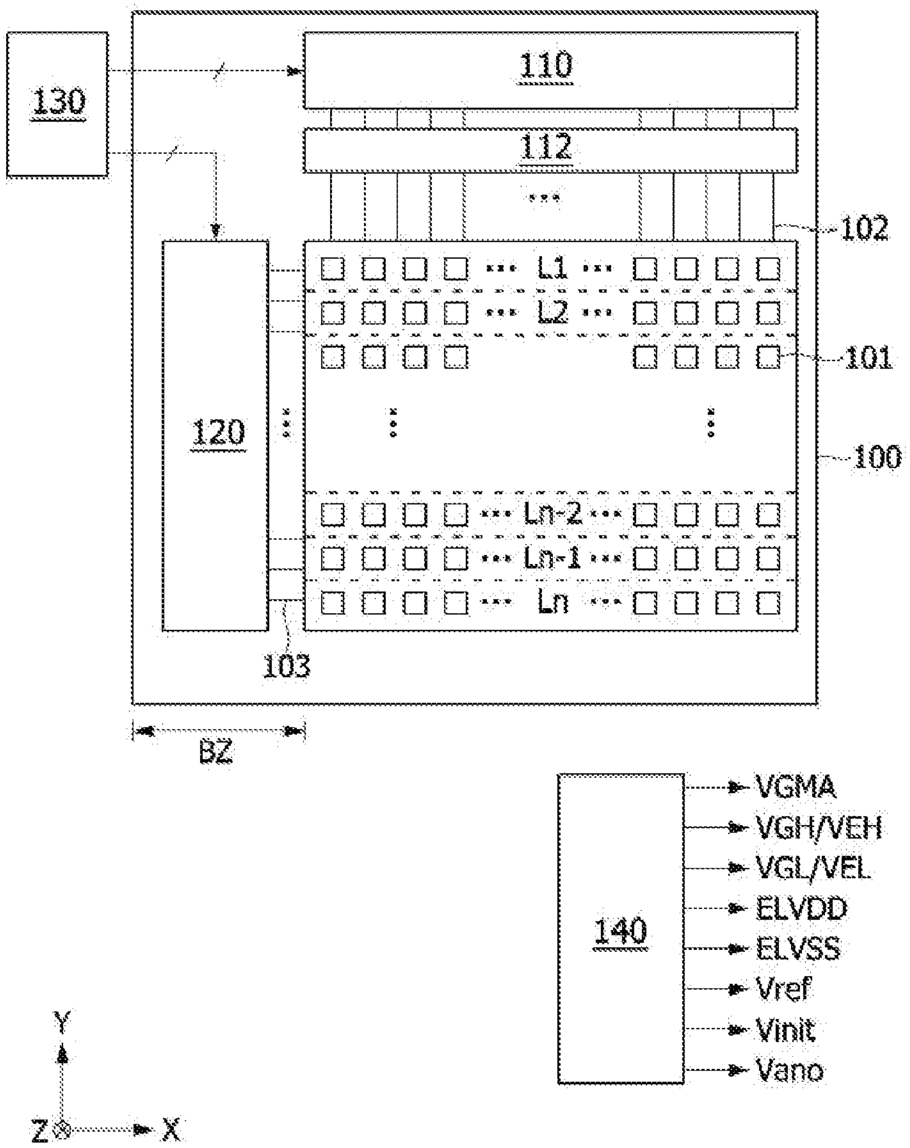
FIG. 1 is a block diagram showing a display device in accordance with one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Each of the pixels may include a plurality of sub-pixels having different colors to in order to reproduce the color of the image on a screen of the display panel. Each of the sub-pixels includes a transistor used as a switch element or a driving element. Such a transistor may be implemented as a TFT (Thin Film Transistor).

A driving circuit of the display device writes a pixel data of an input image to pixels on the display panel. To this end, the driving circuit of the display device may include a data driving circuit configured to supply data signal to the data lines, a gate driving circuit configured to supply a gate signal to the gate lines, and the like.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. In embodiments, descriptions will be given based on an example in which the transistors of the pixel circuit and the gate driving circuit are implemented as the n-channel oxide TFTs, but the present disclosure is not limited thereto.

Generally, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor, since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal can vary between either a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage being on the gate and is turned off in response to the gate-off voltage being present on the gate. In the case of an n-channel transistor, a gate-on voltage may be a gate high voltage such as VGH, VDD, or VEH, and a gate-off voltage may be a gate low voltage such as VGL, VSS or VEL.

Hereinafter, various embodiments of this disclosure will be described with reference to the accompanying drawings. In the following embodiments, the display device will be described mainly with respect to the organic light emitting display device, but this disclosure is not limited thereto. Also, the scope of this disclosure is not intended to be limited by the names of components or signals in the following embodiments and claims.

Figure 2:
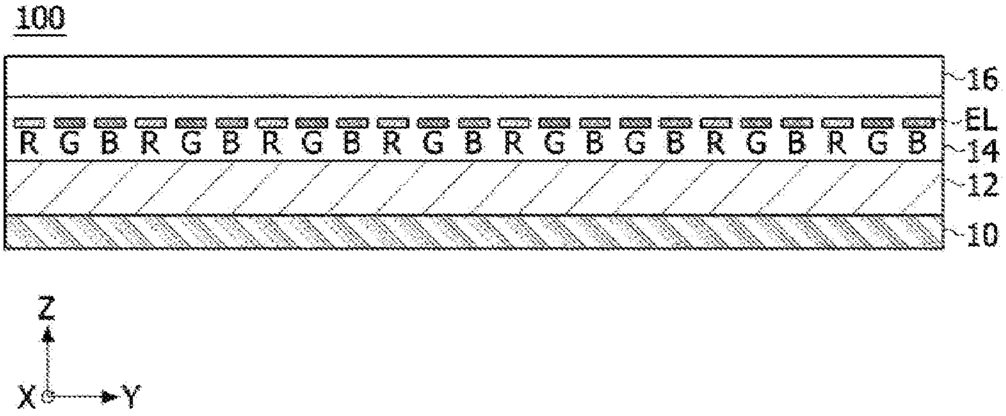
FIG. 2 is a cross-sectional view showing a cross-sectional structure of the display panel shown in FIG. 1.

Referring to FIGS. 1 and 2, a display device in accordance with an embodiment of the present disclosure includes a display panel 100, a display panel driver for writing pixel data onto pixels of the display panel 100, and a power supply 140 that generates electric power required to drive the pixels and the display panel driver.

The display panel 100 may be a display panel of a rectangular structure having a length in the X-axis direction, a width in the Y-axis direction, and a thickness in the Z-axis direction. The display panel 100 includes a pixel array that displays an input image on a screen. The pixel array includes a plurality of data lines 102, a plurality of gate lines 103 intersecting the data lines 102, and pixels arranged in a matrix form. The display panel 100 may further include power lines commonly connected to the pixels. The power lines may include a power line to which a pixel driving voltage ELVDD is applied, a power line to which an initialization voltage Vinit is applied, a power line to which a reference voltage Vref is applied, and a power line to which a low-potential power supply voltage ELVSS is applied. These power lines are commonly connected to the pixels.

The pixel array includes a plurality of pixel lines L1 to Ln. Each of the pixel lines L1 to Ln includes one line of pixels arranged along the line direction X in the pixel array of the display panel 100. Pixels arranged in one pixel line share gate lines 103. Subpixels arranged in the column direction Y along the data line direction share the same data line 102. One horizontal period 1H is a time obtained by dividing one frame period by the total number of pixel lines L1 to Ln The display panel 100 may be implemented with a non-transmissive display panel or a transmissive display panel. The transmissive display panel may be applied to a transparent display device in which an image is displayed on a screen and an actual object in the background is visible.

The display panel may be made of a flexible display panel. The flexible display panel may be implemented with an OLED panel utilizing a plastic substrate. The pixel array and light-emitting element of the plastic OLED panel may be disposed on an organic thin-film adhered onto the back plate.

Each of the pixels 101 may be divided into a red subpixel, a green subpixel, and a blue subpixel to realize colors. Each of the pixels may further include a white subpixel. But the embodiments of the present disclosure are not limited thereto. For example, each of the pixels 101 may be also divided into a yellow subpixel, a magenta subpixel, and a cyan subpixel to realize colors. Other combinations of colors are also possible. Each of the subpixels includes a pixel circuit. In the following, a pixel may be interpreted as the same meaning as a subpixel. Each of the pixel circuits is connected to the data line, gate lines, and power lines.

The pixels may be arranged in real color pixels and pentile pixels. The pentile pixel may realize a higher resolution than the real color pixel by driving two subpixels that are different in colors as one pixel 101 by using a preset pixel rendering algorithm. The pixel rendering algorithm can compensate for the color representation lacking in each of the pixels with the color of the light emitted from an adjacent pixel.

Touch sensors may be disposed on the screen of the display panel 100. The touch sensors may be disposed on the screen of the display panel in an on-cell type or an add-on type or may be implemented with in-cell type touch sensors embedded in the pixel array AA.

As shown in FIG. 2, the display panel 100 may include a circuit layer 12, a light-emitting element layer 14, and an encapsulation layer 16 stacked on a substrate 10 when viewed from the cross-sectional structure.

The circuit layer 12 may include a pixel circuit connected to wiring such as a data line, a gate line, and a power line, a gate driver GIP connected to the gate lines, a demultiplexer array 112, a circuit for auto probe inspection omitted from the drawing, and the like. The wiring and circuit elements of the circuit layer 12 may include a plurality of insulating layers, two or more metal layers separated from each other with the insulating layer therebetween, and an active layer containing a semiconductor material. All the transistors formed in the circuit layer 12 may be implemented with an oxide TFT including an n-channel type oxide semiconductor. But the embodiments of the present disclosure are not limited thereto. For example, at least one transistor formed in the circuit layer 12 may be implemented with an LTPS TFT including an n-channel type oxide semiconductor. Or, at least one transistor formed in the circuit layer 12 may be implemented with a TFT including a p-channel type oxide semiconductor.

The light-emitting element layer 14 may include a light-emitting element EL driven by a pixel circuit. The light-emitting element EL may include a red (R) light-emitting element, a green (G) light-emitting element, and a blue (B) light-emitting element. The light-emitting element layer 14 may include a white light-emitting element and a color filter. The light-emitting elements EL in the light-emitting element layer 14 may be covered with a multi-protective layer in which an organic film and an inorganic film are stacked.

The encapsulation layer 16 covers the light-emitting element layer 14 so as to seal the circuit layer 12 and the light-emitting element layer 14. The encapsulation layer 16 may have a multi-insulating film structure in which an organic film and an inorganic film are alternately stacked. The inorganic film blocks the penetration of moisture or oxygen. The organic film flattens the surface of the inorganic film. If the organic film and the inorganic film are stacked in multiple layers, the travel path of moisture or oxygen becomes longer compared to that of a single layer, and thus, the penetration of moisture and oxygen affecting the light-emitting element layer 14 can be effectively blocked.

A touch sensor layer formed on the encapsulation layer 16 may be disposed. The touch sensor layer may include capacitive touch sensors that sense a touch input based on a change in capacitance before and after the touch input. The touch sensor layer may include metal wiring patterns and insulating films that form the capacitance of the touch sensors. The capacitance of the touch sensor may be formed between the metal wiring patterns. A polarizing plate may be disposed on the touch sensor layer. The polarizing plate can improve the visibility and contrast ratio by converting the polarization of external light reflected by the metal of the touch sensor layer and the circuit layer 12. The polarizing plate may be implemented with a polarizing plate in which a linear polarizing plate and a phase retardation film are bonded, or with a circular polarizing plate. A cover glass may be adhered onto the polarizing plate.

The display panel 100 may further include a touch sensor layer and a color filter layer stacked on the encapsulation layer 16. The color filter layer may include red, green, and blue color filters, and a black matrix pattern. The color filter layer may absorb part of the wavelength of the light reflected from the circuit layer and the touch sensor layer to substitute for the role of the polarizing plate, and may enhance color purity. This embodiment can improve the light transmittance of the display panel and enhance the thickness and flexibility of the display panel by applying the color filter layer 20 having a higher light transmittance than the polarizing plate to the display panel. A cover glass (not shown) may be overlaid onto the cFolor filter layer.

The power supply 140 generates direct current (DC) power necessary for driving the pixel array of the display panel 100 and the display panel driver by using a DC-DC converter. The DC-DC converter may include a charge pump, a regulator, a buck converter, a boost converter, and the like. The power supply 140 may adjust the level of a DC input voltage applied from a host system not shown, and may thus generate constant voltages (or DC voltages) such as a gamma reference voltage VGMA, gate-on voltages VGH, and VEH, gate-off voltages VGL and VEL, a pixel driving voltage ELVDD, a low-potential power supply voltage ELVSS, a reference voltage Vref, an initialization voltage Vinit, and an anode voltage Vano. The gamma reference voltage VGMA is supplied to a data driver 110. The gate-on voltages VGH and VEH and the gate-off voltages VGL and VEL are supplied to a gate driver 120. The constant voltages such as the pixel driving voltage ELVDD, the low-potential power supply voltage ELVSS, the reference voltage Vref, the initialization voltage Vinit, and the anode voltage Vano are commonly supplied to the pixels.

The display panel driver writes pixel data of an input image onto the pixels of the display panel 100 under the control of a timing controller TCON, 130.

The display panel driver includes the data driver 110 and the gate driver 120. The display panel driver may further include a demultiplexer array 112 disposed between the data driver 110 and the data lines 102.

The demultiplexer array 112 sequentially supplies the data voltages outputted from each of the channels of the data driver 110 to the data lines 102 by using a plurality of demultiplexers DEMUX. The demultiplexer may include a plurality of switch elements disposed on the display panel 100. If the demultiplexer is disposed between the output terminals of the data driver 110 and the data lines 102, the number of channels in the data driver 110 may be reduced. The demultiplexer array 112 may be omitted.

The display panel driver may further include a touch sensor driver for driving the touch sensors. The touch sensor driver is omitted from FIG. 1. The data driver and the touch sensor driver may be integrated into one drive IC (integrated circuit). The timing controller 130, the power supply 140, the data driver 110, the touch sensor driver, and the like in a mobile device or a wearable device may be integrated into one drive IC.

The display panel driver may operate in a low-speed driving mode under the control of the timing controller 130. The low-speed driving mode may be set to reduce the power consumption of the display device when an input image is analyzed and the input image does not change for a preset time. The low-speed driving mode can reduce the power consumption of the display panel driver and the display panel 100 by lowering the refresh rate of pixels when a still image is inputted for a selected time or longer. The low-speed driving mode is not limited to when a still image is inputted. For example, when the display device operates in a standby mode or when a user command or input image is not inputted to the display panel driving circuit for a selected time or longer, the display panel driving circuit may operate in the low-speed driving mode.

The data driver 110 converts the pixel data of an input image, which is received in a digital signal from the timing controller 130 for each frame period, into a gamma compensation voltage by using a digital to analog converter (DAC), and thus generates a data voltage. The gamma reference voltage VGMA is divided into a gamma compensation voltage for each gray scale through a voltage divider circuit, and supplied to the DAC. The data voltage is outputted through an output buffer in each of the channels of the data driver 110.

The gate driver 120 may be implemented with a GIP (gate in panel) circuit formed directly on the circuit layer 12 of the display panel 100 together with a TFT array and wiring of the pixel array. The GIP circuit may be disposed on bezel areas BZ, which are non-display areas of the display panel 100, or may be disposed in a distributed manner in the pixel array in which an input image is reproduced. The gate driver 120 sequentially outputs gate signals to the gate lines 103 under the control of the timing controller 130. The gate driver 120 may sequentially supply the gate signals to the gate lines 103 by shifting the gate signals by using a shift register. The gate signal may include a scan pulse, an emission control pulse (hereinafter, referred to as an “EM pulse”), an initialization pulse, and a sensing pulse.

The shift register of the gate driver 120 outputs pulses of the gate signals in response to a start pulse and a shift clock from the timing controller 130, and shifts the pulses according to the shift clock timing.

The timing controller 130 receives digital video data DATA of an input image and a timing signal synchronized therewith from a host system. The timing signal may include a vertical synchronization signal Vsync, a horizontal synchronization signal Hsync, a clock CLK, a data enable signal DE, and the like. Since the vertical period and the horizontal period can be known by a method of counting the data enable signals DE, the vertical synchronization signal Vsync and the horizontal synchronization signal Hsync may be omitted. The data enable signal DE has a period of two horizontal period 1H.

The host system may be any one of a television (TV) system, a tablet computer, a laptop computer, a navigation system, a personal computer (PC), a home theater system, a mobile device, a wearable device, and a vehicle system. The host system may scale an image signal from a video source so as to match the resolution of the display panel 100 and transmit it to the timing controller 13 together with the timing signal.

The timing controller 130 may multiply an input frame frequency by i in a normal driving mode, and control the operation timing of the display panel driver with a frame frequency of the input frame frequency×i (i is a natural number) Hz. The input frame frequency is 60 Hz in the NTSC (National Television Standards Committee) method and 50 Hz in the PAL (Phase-Alternating Line) method. The timing controller 130 may lower the driving frequency of the display panel driver by decreasing the frame frequency to a frequency between 1 Hz and 30 Hz in order to lower the refresh rate of pixels in the low-speed driving mode.

The timing controller 130 generates a data timing control signal for controlling the operation timing of the data driver 110, a control signal for controlling the operation timing of the demultiplexer array 112, and a gate timing control signal for controlling the operation timing of the gate driver 120, based on the timing signals Vsync, Hsync, and DE received from the host system. The timing controller 130 controls the operation timing of the display panel driver, and thereby, synchronizes the data driver 110, the demultiplexer array 112, the touch sensor driver, and the gate driver 120.

The voltage level of the gate timing control signal outputted from the timing controller 130 may be converted into the gate-on voltages VGH and/or VEH and the gate-off voltages VGL and/or VEL through a level shifter that is not shown, and supplied to the gate driver 120. The level shifter converts a low-level voltage of the gate timing control signal into the gate-off voltages VGL and VEL, and converts a high-level voltage of the gate timing control signal into the gate-on voltages VGH and VEH. The gate timing signal includes a start pulse and a shift clock.

There may be differences in electrical characteristics of the driving element between pixels due to device characteristic variations and process variations caused in the manufacturing process of the display panel 100, and these differences may grow larger as the driving time of pixels elapses. In order to compensate for variations in electrical characteristics of the driving element between pixels, an internal compensation technique or an external compensation technique may be applied to the organic light-emitting display device. The internal compensation technique samples the threshold voltage of the driving element for each subpixel by using an internal compensation circuit implemented in each of the pixel circuits, and thereby compensates the gate-source voltage Vgs of the driving element by the threshold voltage. The external compensation technique senses in real-time the current or voltage of the driving element that changes according to the electrical characteristics of the driving element by using an external compensation circuit. The external compensation technique compensates in real-time for the variations (or changes) in electrical characteristics of the driving element in each of the pixels by modulating the pixel data (digital data) of the input image by the amount of the variations (or changes) in electrical characteristics of the driving element sensed for each pixel. The display panel driver may drive the pixels by using the external compensation technique and/or the internal compensation technique. The pixel circuit of the present disclosure may be implemented with a pixel circuit to which the internal compensation circuit is applied.

Figure 3:
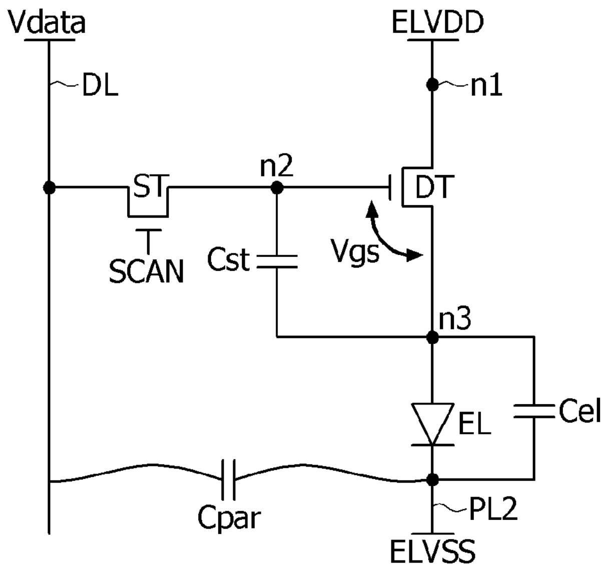
FIG. 3 is a circuit diagram showing one example of a pixel circuit in accordance with a comparative example in which a source voltage of a driving element is affected by the ripple of a low-potential power supply voltage ELVSS.
Figure 4:
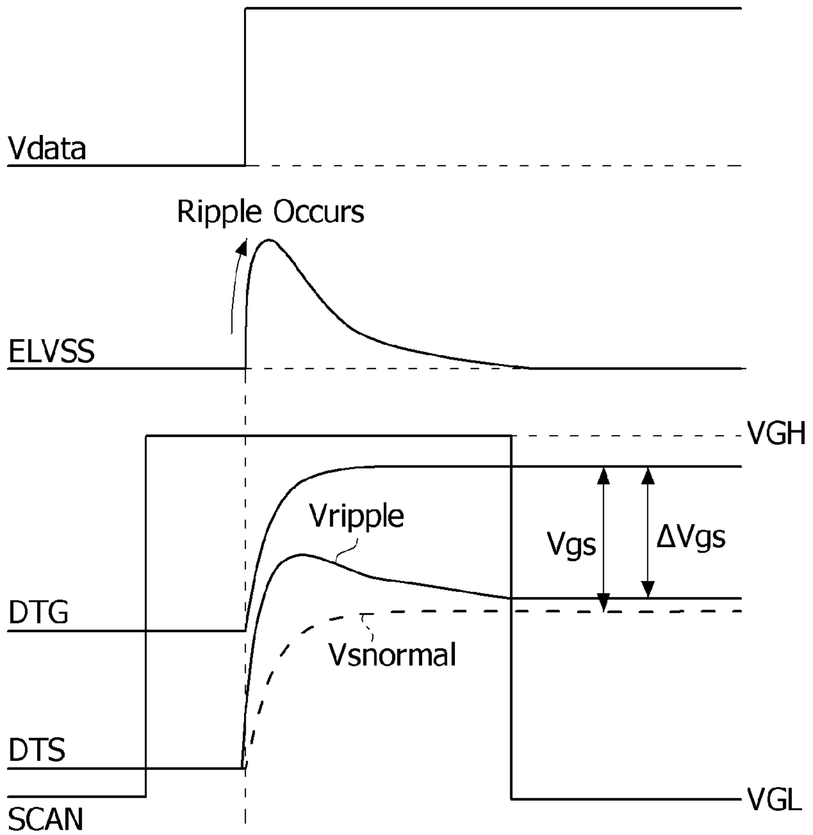
FIG. 4 is a waveform diagram showing an example in which the gate-source voltage of the driving element changes when ripples occur in the low-potential power supply voltage.

FIG. 3 is a circuit diagram showing one example of a pixel circuit in accordance with a comparative example in which a gate-source voltage Vgs of a driving element DT is affected by the ripple of a low-potential power supply voltage ELVSS. FIG. 4 is a waveform diagram showing an example in which the gate-source voltage Vgs of the driving element DT changes when ripples occur in the low-potential power supply voltage ELVSS;

Referring to FIGS. 3 and 4, the pixel circuit in accordance with the comparative example includes a light-emitting element EL, a driving element DT, a switch element ST, and a capacitor Cst.

In the pixel circuit of the comparative example, the light-emitting element EL may further include a capacitor Cel formed between the anode electrode and the cathode electrode. In the pixels, a power line or an electrode to which the low-potential power supply voltage ELVSS is applied is commonly connected. The driving element DT includes a first electrode connected to a first node n1, a gate electrode connected to a second node n2, and a second electrode connected to a third node n3. The first node n1 is connected to a first power line to which a pixel driving voltage ELVDD is applied. The light-emitting element EL includes an anode electrode connected to the third node and a cathode electrode connected to a second power line PL2 to which the low-potential power supply voltage ELVSS is applied. The driving element DT generates a current for driving the light-emitting element EL according to the gate-source voltage Vgs.

The switch element ST includes a first electrode to which a data voltage Vdata of pixel data is applied, a gate electrode to which a scan pulse SCAN is applied, and a second electrode connected to the second node n2. The switch element ST is turned on according to a gate-on voltage VGH of the scan pulse SCAN and supplies the data voltage Vdata to the second node n2. The capacitor Cst stores the gate-source voltage Vgs of the driving element DT.

The anode electrode of the light-emitting element EL may be connected to the second electrode of the driving element DT, and a parasitic capacitance Cpar may exist between a data line DL and the second power line PL2. In such a pixel circuit of the comparative example, when the amount of change in the data voltage Vdata is relatively large, ripples occur in the low-potential power supply voltage ELVSS applied to the second power line PL2 through the parasitic capacitance Cpar. The low-potential power supply voltage ELVSS is transmitted to the third node n3 through the capacitor Cel of the light-emitting element EL. In this case, the voltage of the third node n3 or a source voltage DTS is changed by the ripple of the low-potential power supply voltage ELVSS, resulting in a change in the luminance of the light-emitting element EL.

In FIG. 4, 'DTG' is the gate voltage of the driving element DT, also labelled n2, and 'DTS' is the source voltage of the driving element DT, also labelled n3. 'Vripple' is a source voltage DTS that is changed under the influence of the ripple of the low-potential power supply voltage ELVSS. 'ΔVgs' is a gate-source voltage of the driving element DT that is changed under the influence of the low-potential power supply voltage ELVSS. 'Vsnormal' represents an ideal source voltage DTS in which there is no ripple of the low-potential power supply voltage ELVSS or which is not affected by the ripple of the low-potential power supply voltage ELVSS. 'Vgs' is the gate-source voltage of the driving element DT when there is no ripple of the low-potential power supply voltage ELVSS. If a ripple is present, the ΔVgs might be sufficiently large that it will affect the turn on timing and operational characteristics of the drive element DT. This can cause the luminance output by the EL to be less than the desired value. The inventors have realized it is difficult to stop all ripples in the ELVSS and have therefore designed a pixel circuit that causes the EL to output the target luminance and operate on the designed timing and within the specifications of the desire characteristics.

The pixel circuits of the present disclosure block the influence of ripples in the low-potential power supply voltage ELVSS and the light-emitting element EL on the gate-source voltage Vgs of the driving element DT in each of the subpixels. One technique to achieve this is by adding a switch element M04 between the light-emitting element EL and the third node n3, as shown in FIGS. 5 to 19D. The transistor M04 therefore acts as isolation switch to electrically isolate the drive transistor DT from the light emitting element EL during certain time periods of the circuit operation.

Figure 5:
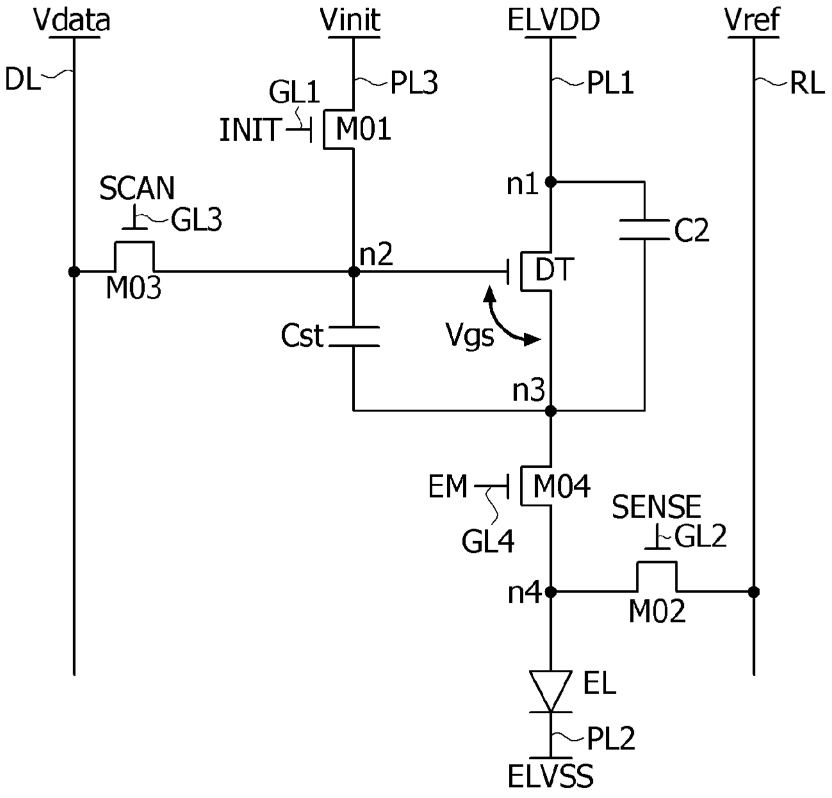
FIG. 5 is a circuit diagram showing a pixel circuit in accordance with a first embodiment of the present disclosure.
Figure 6:
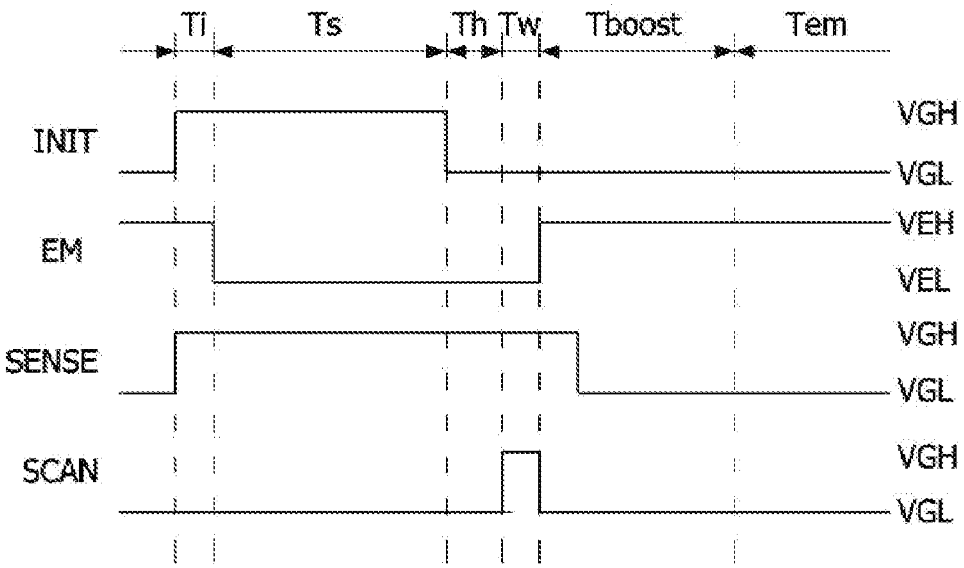
FIG. 6 is a waveform diagram showing gate signals applied to the pixel circuit shown in FIG. 5.
Figure 7:
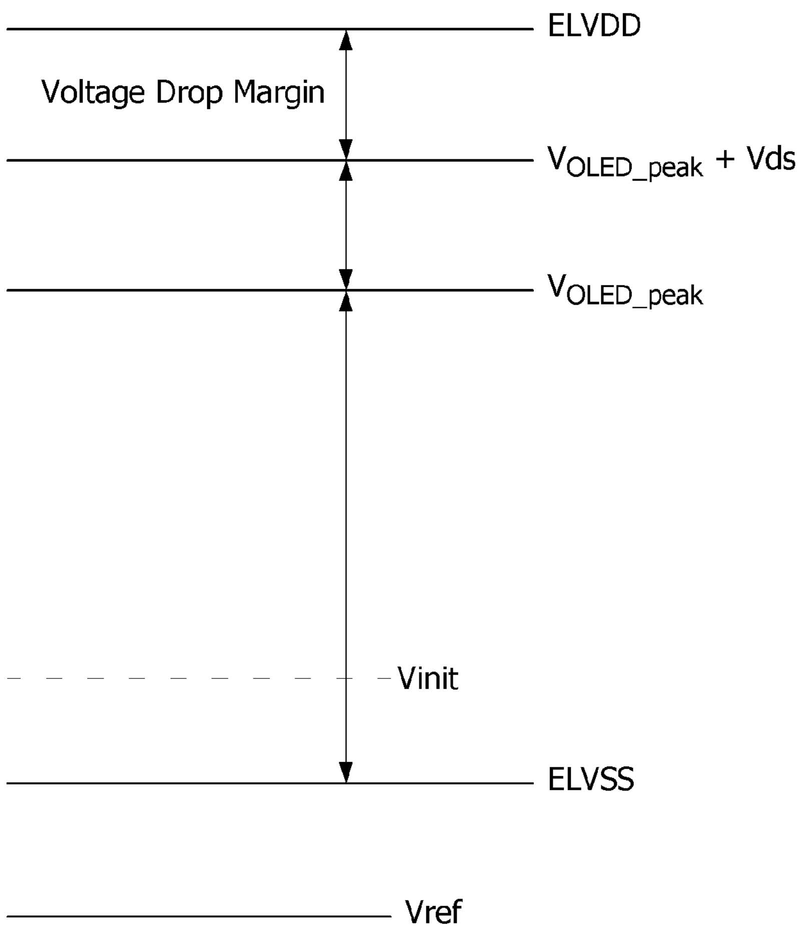
FIG. 7 is a diagram showing constant voltages applied to the pixel circuit shown in FIG. 5.

FIG. 5 is a circuit diagram showing a pixel circuit in accordance with a first embodiment of the present disclosure. FIG. 6 is a waveform diagram showing gate signals applied to the pixel circuit shown in FIG. 5. FIG. 7 is a diagram showing constant voltages applied to the pixel circuit shown in FIG. 5.

Referring to FIGS. 5 and 6, the pixel circuit includes a light-emitting element EL, a driving element DT for driving the light-emitting element EL, a plurality of switch elements M01 to M04, a first capacitor Cst, and a second capacitor C2. The driving element DT and the switch elements M01 to M04 may be implemented with n-channel oxide TFTs. But the embodiments of the present disclosure are not limited thereto. For example, at least one of the driving element DT and the switch elements M01 to M04 may be implemented with n-channel TFTs of other type or even p-channel TFTs.

This pixel circuit is connected to a first power line PL1 to which a pixel driving voltage ELVDD is applied, a second power line PL2 to which a low-potential power supply voltage ELVSS is applied, a third power line PL3 to which an initialization voltage Vinit is applied, a fourth power line RL to which a reference voltage Vref is applied, a data line DL to which a data voltage Vdata is applied, and gate lines GL1 to GL4 to which gate signals INIT, SENSE, SCAN, and EM are applied.

The pixel circuit may be driven in an initialization step Ti, a sensing step Ts, a data writing step Tw, and a light emission step Tem, as shown in FIG. 6. In the initialization step Ti, the pixel circuit is initialized. In the sensing step Ts, the threshold voltage Vth of the driving element DT is sensed and stored in the first capacitor Cst. In the data writing step Tw, the data voltage Vdata of pixel data is applied to a second node n2. After the voltages at the second and third nodes n2 and n3 rise in a boosting step Tboost, the light-emitting element EL may emit light at a luminance corresponding to the gray scale value of the pixel data in the light emission step Tem.

In the initialization step Ti, the voltages of an initialization pulse INIT, an EM pulse, and a sensing pulse SENSE are gate-on voltages VGH and VEH, and the voltage of a scan pulse SCAN is a gate-off voltage VGL. In the sensing step Ts, the voltages of the initialization pulse INIT and the sensing pulse SENSE are the gate-on voltage VGH, and the voltages of the EM pulse EM and the scan pulse SCAN are the gate-off voltages VGL and VEL. In the data writing step Tw, the scan pulse SCAN synchronized with the data voltage Vdata of the pixel data is generated at the gate-on voltage VGH. The voltage of the sensing pulse SENSE is the gate-on voltage VGH in the data writing step Tw. The voltages of the initialization pulse INIT, and the EM pulse EM are the gate-off voltages VGL and VEL in the data writing step Tw. In the light emission step Tem, the voltage of the EM pulse EM is the gate-on voltage VEH, and the voltages of the other gate signals INIT, SENSE, and SCAN are the gate-off voltage VGL.

The transistor M04 therefore acts as isolation switch to electrically isolate the second terminal of the drive transistor DT from the first terminal of light emitting element EL during the initialization period of the circuit operation. It can also remain isolated during the sensing and data write time periods. This prevents ripples in the ELVSS from affecting the light output voltage on the light emitting element EL. The light output voltage is a function of the voltage drop across the light emitting element, in this example a diode and this determines the brightness or lumens output by that particular diode.

A hold period Th may be present as an option between the sensing step Ts and the data writing step Tw, but this is optional. During the hold period Th, the voltage of the gate signals INIT, EM, and SCAN are the gate-off voltages VGL and VEL and the voltage of gate signal SENSE is VGH. A boosting step Tboost may also be present between the data writing step Tw and the light emission step Tem, but this is optional as well. In the boosting step Tboost, the voltage of the EM pulse EM is inverted to become the gate-on voltage VEH, and the voltages of the scan pulse SCAN and the sensing pulse SENSE are inverted to the gate-off voltage VGL, but as shown, there might be timing lag between when the Tboost starts and the value of the SENSE inverts to become VGL. In the boosting step Tboost, the voltage of the initialization pulse INIT maintains the gate-off voltage VGL. During the boosting step Tboost, the voltages at the second and third nodes n2 and n3 rise.

The constant voltages ELVDD, ELVSS, Vinit, and Vref applied to the pixel circuit may be set according to any one or more of the following relationship values of: ELVDD>Vinit>ELVSS>Vref or ELVDD>Vinit>Vref>ELVSS, including a voltage drop margin for the operation in the saturation region of the driving element DT, as shown in FIG. 7. In FIG. 7, $V_{OLED\_peak}$ is a peak voltage between both ends of the light-emitting element EL. These constant voltages ELVDD, ELVSS, Vinit, and Vref may be set such that Vgs≤Vds in the worst condition. Vref might change value depending on the mode of operation, for example, whether in sensing mode or some other mode. In FIG. 7, 'Vds' is the drain-source voltage of the driving element DT. The gate-on voltages VGH and VEH may be set to voltages higher than the pixel driving voltage ELVDD, and the gate-off voltages VGL and VEL may be set to voltages lower than the low-potential power supply voltage ELVSS.

The power supply 140 provides the signals having the voltages shown in the FIGS. 6 and 7 according to the timing shown and supplies them to the various nodes in FIGS. 8A-8D, as will now be described. A processor or other controller is used to ensure the desired voltages and currents are provided on the timing shown. The design and operation of such power supplies, their controllers and the routing of signals and voltages on conductive lines from the power supply 140 to the respective pixels are well known in the art and thus the details are not provided.

In the pixel circuit shown in FIG. 5, the light-emitting element EL may be implemented with an OLED. The OLED includes an organic compound layer formed between the anode electrode and the cathode electrode. The organic compound layer may include, but is not limited to, a hole injection layer HIL, a hole transport layer HTL, an emission layer EML, an electron transport layer ETL, and an electron injection layer EIL. The anode electrode of the light-emitting element EL is connected to a fourth node n4, and the cathode electrode is connected to the second power line PL2 to which the low-potential power supply voltage ELVSS is applied. When a voltage is applied to the anode and cathode electrodes of the light-emitting element EL, the holes that have passed through the hole transport layer HTL and the electrons that have passed through the electron transport layer ETL are moved to the emission layer EML, and excitons are formed and visible light is emitted from the emission layer EML. The OLED used as the light emitting element EL may have a tandem structure in which a plurality of emitting layers are stacked. The OLED of the tandem structure can improve the luminance and lifespan of pixels.

The driving element DT generates a current according to the gate-source voltage Vgs and thereby drives the light-emitting element EL. The driving element DT includes a first electrode connected to a first node n1, a gate electrode connected to the second node n2, and a second electrode connected to the third node n3.

The first capacitor Cst is connected between the second node n2 and the third node n3. The second capacitor C2 is connected between the first node n1 and the third node n3.

A first switch element M01 is turned on according to the gate-on voltage VGH of the initialization pulse INIT in the initialization step Ti and applies the initialization voltage Vinit to the second node n2. The first switch element M01 includes a first electrode connected to the third power line PL3 to which the initialization voltage Vinit is applied, a gate electrode connected to a first gate line GL1 to which the initialization pulse INIT is applied, and a second electrode connected to the second node n2.

A second switch element M02 is turned on according to the gate-on voltage VGH of the sensing pulse SENSE in the sensing step Ts and the data writing step Tw and supplies the reference voltage Vref to the fourth node n4. The second switch element M02 may maintain the on state in the hold period Th. The second switch element M02 includes a first electrode connected to the fourth node n4, a gate electrode connected to a second gate line GL2 to which the sensing pulse SENSE is applied, and a second electrode connected to the fourth power line RL.

A third switch element M03 is turned on according to the gate-on voltage VGH of the scan pulse SCAN synchronized with the data voltage Vdata in the data writing step Tw, and connects the data line DL to the second node n2. The data voltage Vdata is applied to the second node n2 in the data writing step Tw. The third switch element M03 includes a first electrode connected to the data line DL to which the data voltage Vdata is applied, a gate electrode connected to a third gate line GL3 to which the scan pulse SCAN is applied, and a second electrode connected to the second node n2.

A fourth switch element M04 is turned on according to the gate-on voltage VEH of the EM pulse EM in the initialization step Ti, the boosting step Tboost, and the light emission step Tem, and connects the third node n3 to the fourth node n4. The fourth switch element M04 includes a first electrode connected to the third node n3, a gate electrode connected to a fourth gate line GL4 to which the EM pulse EM is applied, and a second electrode connected to the fourth node n4.

Figure 8A:
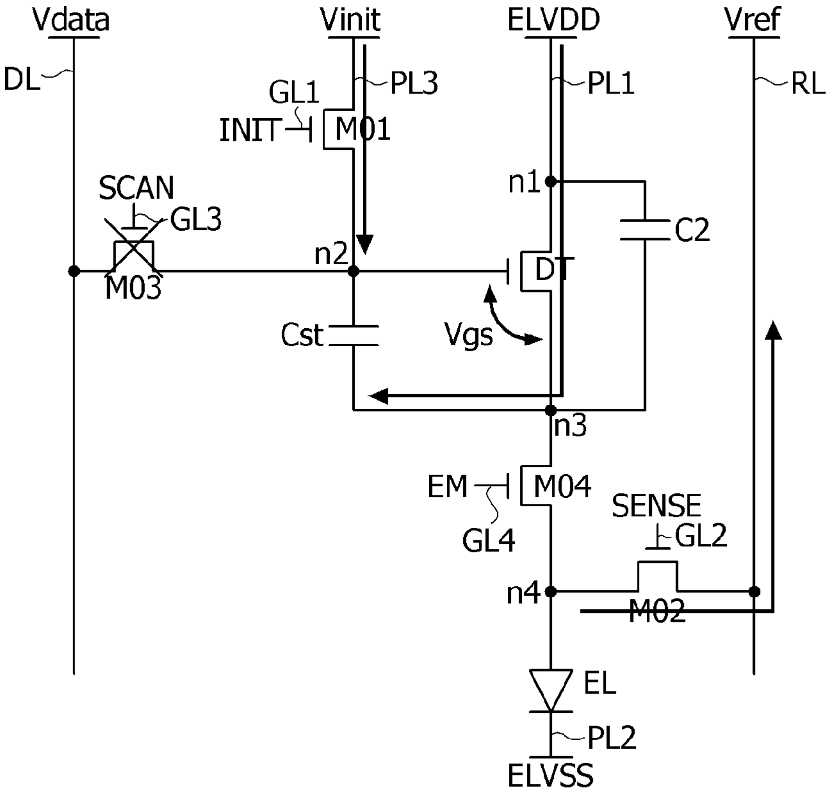
FIGS. 8A to 8D are circuit diagrams showing, in steps, the operation of the pixel circuit shown in FIG. 5.

In the initialization step Ti, the first, second, and fourth switch elements M01, M02, and M04 are turned on, and the third switch element M03 is turned off, as shown in FIG. 8A. At this time, the driving element DT is turned on, and the light-emitting element EL is not turned on.

Figure 8B:
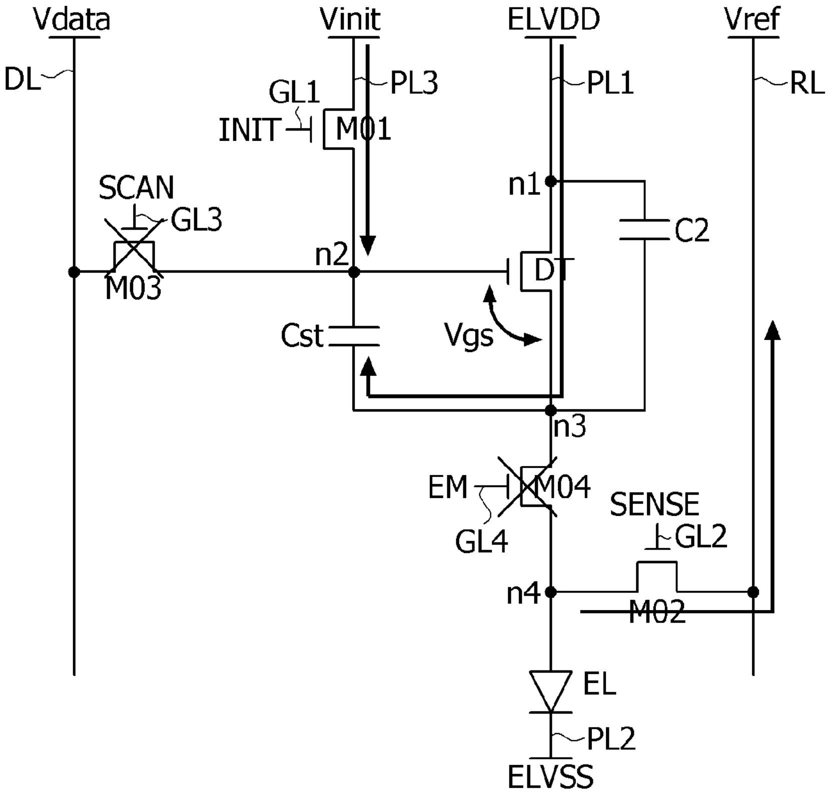

In the sensing step Ts, as shown in FIG. 8B, when the first and second switch elements M01 and M02 maintain the on state and the voltage at the third node n3 rises and thus the gate-source voltage Vgs of the driving element DT reaches the threshold voltage Vth, the driving element DT is turned off and the threshold voltage Vth is stored in the first capacitor Cst. Since the fourth switch element M04 is turned off in the sensing step Ts, the third node n3 is not affected by the low-potential power supply voltage ELVSS and the light-emitting element EL. If there is an effect from ripple of the low-potential power supply voltage ELVSS is discharged to the fourth power line RL to which the reference voltage Vref is applied through the second switch element M02. Or, depending on the value of the ripple, its effect might be fully blocked by EL. In the hold period Th, if present, the second node n2 and the third node n3 are floating to thereby maintain their previous voltages, and the voltage of the fourth node n4 is the reference voltage Vref.

Figure 8C:
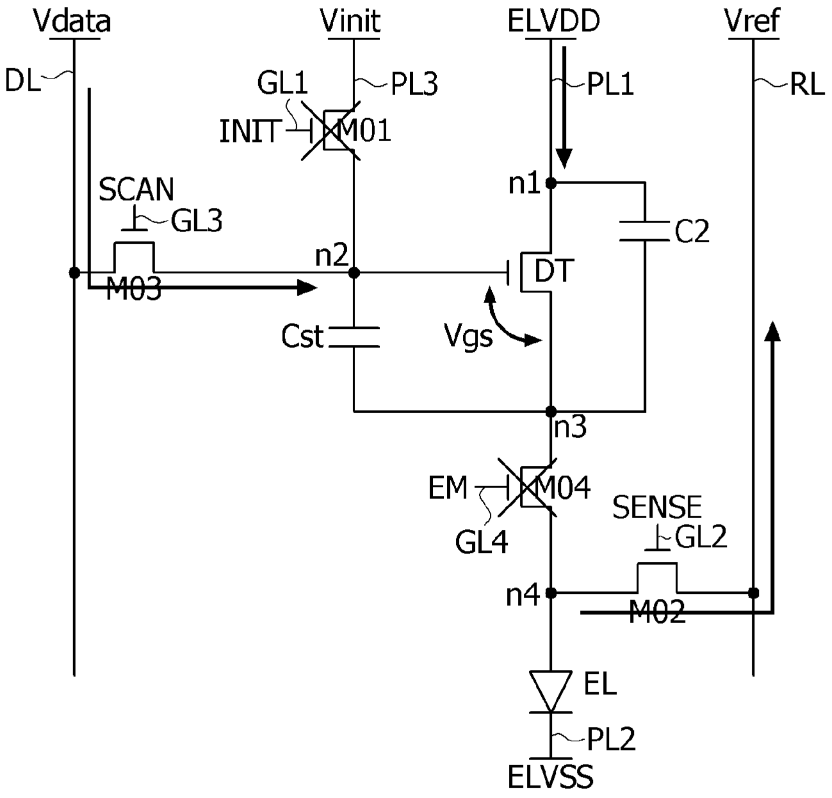

In the data writing step Tw, the third switch element M03 is turned on by the SCAN going high, and the first switch element M01 is turned off, as shown in FIG. 8C. At this time, the data voltage Vdata of the pixel data is applied to the second node n2, and thus, the voltage of the second node n2 increases to approach or be equal to the data voltage Vdata.

During the boosting step Tboost, the fourth switch element M04 is turned on, and the first, second, and third switch elements M01, M02, and M03 are turned off. This increase the voltage on one plate of the capacitor Cst and which causes the voltage on the other plate of the capacitor Cst, which is also node n2, to rise. At this time, the voltages of the second and third nodes n2 and n3 rise.

Figure 8D:
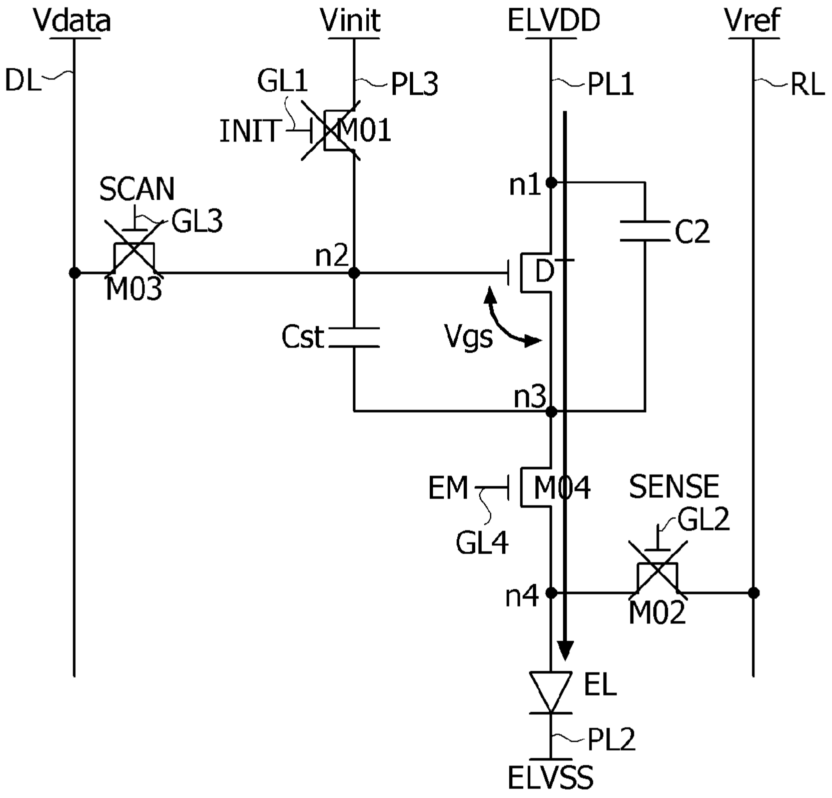

In the light emission step Tem, the fourth switch element M04 is maintained in the on state, and the first, second, and third switch elements M01, M02, and M03 are maintained in the off state, as shown in FIG. 8D. The drive transistor DT turns on. At this time, a current generated according to the gate-source voltage Vgs of the driving element DT, i.e., the voltage between the second and third nodes, is supplied to the light-emitting element EL, and the light-emitting element EL can emit light.

The pixel circuit of the present disclosure cuts off the current path between the third node n3 and the low-potential power supply voltage ELVSS by turning off the fourth switch element M04 in the sensing step Ts and the data writing step Tw, as described above. As a result, value at n3 is not affected by any ripple in ELVSS. Since the gate-source voltage Vgs of the driving element DT is not affected by variations in the low-potential power supply voltage ELVSS and the voltage of the light-emitting element EL in the sensing step Ts and the data writing step Tw, the image quality of the display device does not deteriorate even when the low-potential power supply voltage ELVSS and the anode voltage of the light-emitting element EL have ripples or change. The display device of the present disclosure can realize excellent image quality in which luminance fluctuations or crosstalk of pixels is reduced or does not occur even in an image in which the data voltage Vdata might change significantly due to a crosstalk pattern. Thus a user does not visually recognize and changes in luminance due to variations in the cathode resistance, ELVSS ripple, or cathode voltage.

Figure 9:
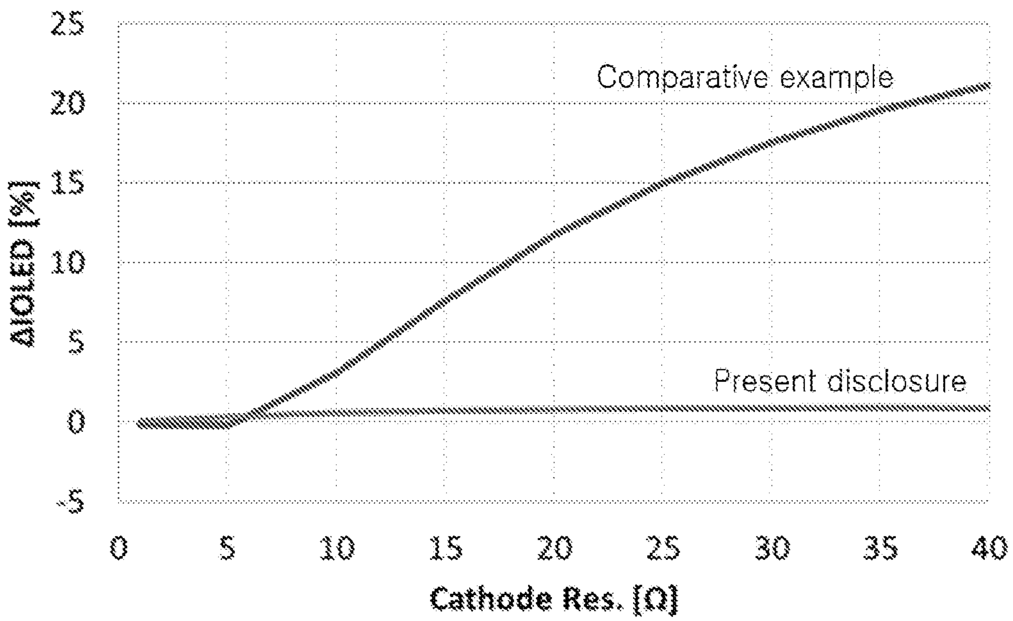
FIG. 9 is a view showing experimental results of showing percent (%) changes of the luminance of a light-emitting element in the pixel circuit of the comparative example shown in FIG. 3 and the luminance of light emitting element of pixel circuit of the present disclosure shown in FIG. 5, each based on variations in the cathode resistance, which in turn will affect the cathode voltage.

FIG. 9 is a view showing experimental results that provides a comparison of the % changes in the luminance of the light-emitting element based on changes in the cathode resistance, which in turn affects the cathode voltage of the light-emitting element in the pixel circuit of the comparative example shown in FIG. 3 and the pixel circuit of the present disclosure shown in FIG. 5.

Referring to FIG. 9, in the pixel circuit of the comparative example, since the light-emitting element EL is directly connected to the third node n3, the gate-source voltage Vgs of the driving element DT can change when the ripple of the low-potential power supply voltage ELVSS or the voltage of the light-emitting element EL changes. The low-potential power supply voltage ELVSS is commonly applied to all the pixels through the second power line PL2 connected to all the pixels. The second power line PL2 can correspond to the work function of the light-emitting element EL and may be a high resistance metal in consideration of microcavities. If the resistance of the cathode electrode of the light-emitting element EL connected to the high resistance metal of the cathode voltage supply line increases, the RC delay of the second power line PL2 increases and becomes vulnerable to ripple. For this reason, in the comparative example, as the cathode resistance of the light-emitting element EL increases, the luminance change ΔOLED as a % of the light-emitting element EL grows larger. On the other hand, in the present disclosure, the luminance of the light-emitting element EL hardly changes even if the cathode resistance changes. The cathode resistance may change over time, which will case a change in the cathode voltage, which voltage is vulnerable to the ripple of the low-potential power supply voltage ELVSS. A circuit according to the present disclosure is not affected by the variations in cathode resistance or cathode voltage ripples because the current path between the second electrode of the driving element DT and the light-emitting element EL is cut off in the sensing step Ts and the data writing step Tw.

Some of the features that are common to the circuits and operation of each of embodiments of FIGS. 5, 10, 13, 17 and 20 might not be described with respect to each figure to avoid unnecessary repetition. Those of skill in the art will recognize those features and operation that are common to the respective embodiments. Similarly, the comparison graph of FIG. 9 is applicable to each of the embodiments and will not repeated to avoid repetition.

Figure 10:
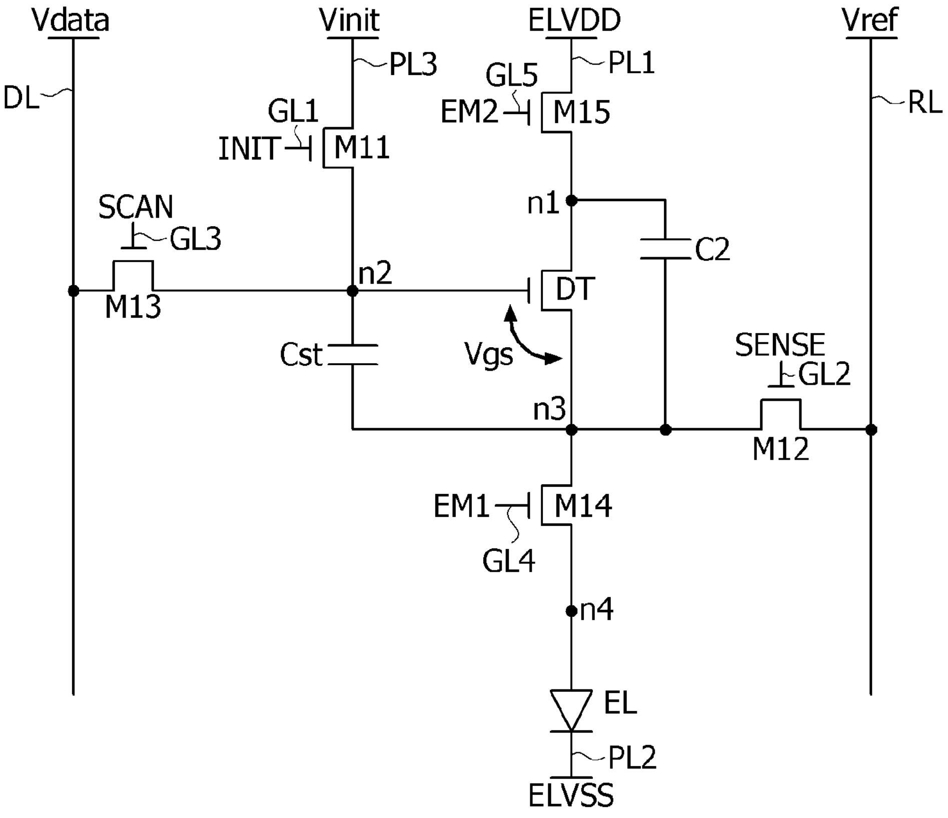
FIG. 10 is a circuit diagram showing a pixel circuit in accordance with a second embodiment of the present disclosure.
Figure 11:
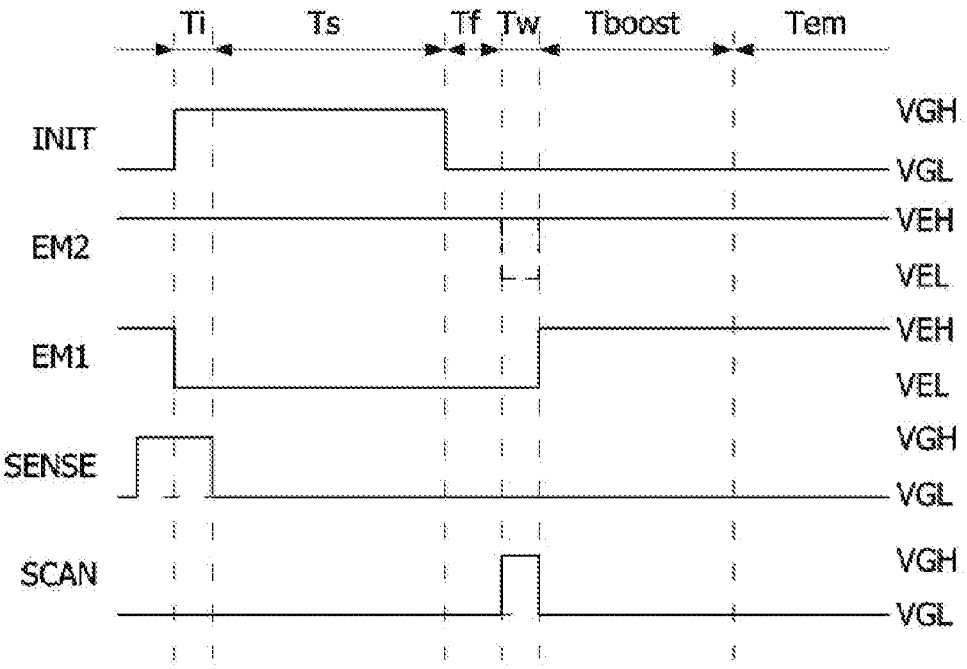
FIG. 11 is a waveform diagram showing gate signals applied to the pixel circuit shown in FIG. 10.

FIG. 10 is a circuit diagram showing a pixel circuit in accordance with a second embodiment of the present disclosure. FIG. 11 is a waveform diagram showing gate signal applied to the pixel circuit shown in FIG. 10.

Referring to FIGS. 10 and 11, the pixel circuit includes a light-emitting element EL, a driving element DT for driving the light-emitting element EL, a plurality of switch elements M11 to M15, a first capacitor Cst, and a second capacitor C2. The driving element DT and the switch elements M11 to M15 may be implemented with n-channel oxide TFTs. But the embodiments of the present disclosure are not limited thereto. For example, at least one of the driving element DT and the switch elements M11 to M15 may be implemented with n-channel TFTs of other type or even p-channel TFTs.

As previously described with respect to FIGS. 6, 7 and 8A-8D, the power supply 140 provides the signals having the voltages shown in the FIGS. 10 and 11 according to the timing shown and supplies them to the various nodes in FIGS. 12A-12D, as described herein. A processor or other controller is used to ensure the desired voltages and currents are provided on the timing shown. The design and operation of such power supplies and their controllers are well known in the art and thus the details are not provided. Power supply 140 provides these same signals and voltages for each of the various embodiments described herein and for all Figures, so it will not be further repeated herein.

This pixel circuit is connected to a first power line PL1 to which a pixel driving voltage ELVDD is applied, a second power line PL2 to which a low-potential power supply voltage ELVSS is applied, a third power line PL3 to which an initialization voltage Vinit is applied, a fourth power line RL to which a reference voltage Vref is applied, a data line DL to which a data voltage Vdata is applied, and gate lines GL1 to GL5 to which gate signals INIT, SENSE, SCAN, EM1, and EM2 are applied.

The pixel circuit may be driven in an initialization step Ti, a sensing step Ts, a data writing step Tw, and a light emission step Tem, as shown in FIG. 10. In the initialization step Ti, the pixel circuit is initialized. In the sensing step Ts, the threshold voltage Vth of the driving element DT is sensed and stored in the first capacitor Cst. In the data writing step Tw, the data voltage Vdata of pixel data is applied to a second node n2. After the voltages at the second and third nodes n2 and n3 rise in a boosting step Tboost, the light-emitting element EL may emit light at a luminance corresponding to the gray scale value of the pixel data in the light emission step Tem.

Figure 12A:
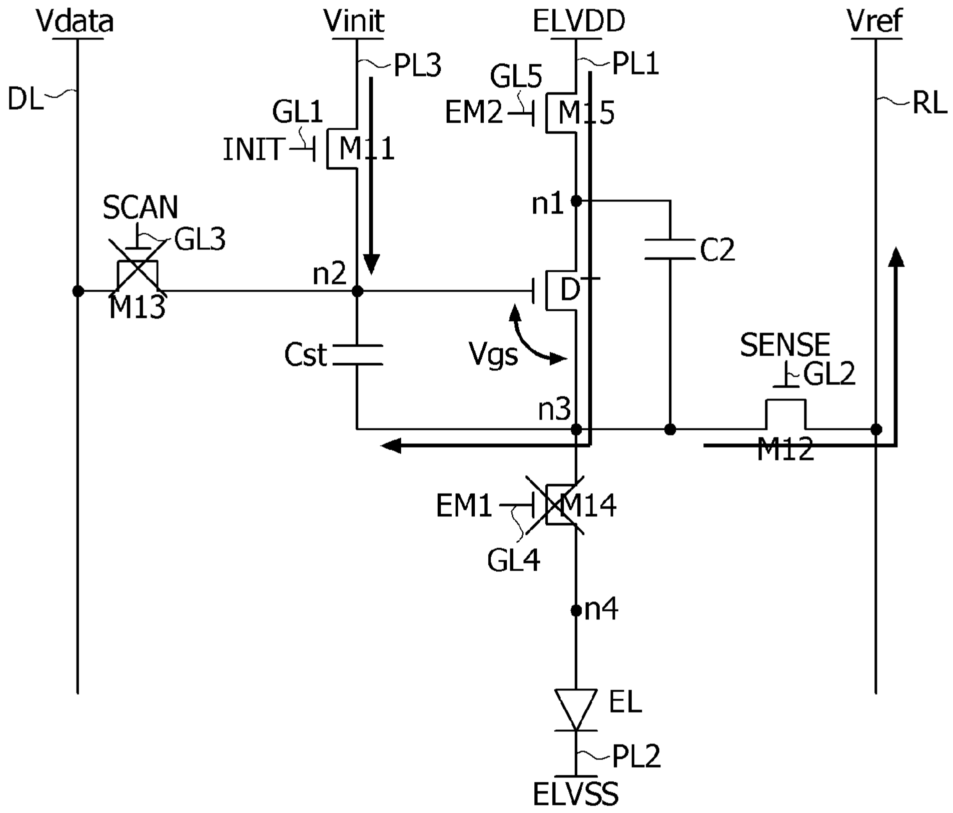
FIGS. 12A to 12D are circuit diagrams showing, in steps, the operation of the pixel circuit shown in FIG. 11.

In the initialization step Ti, the voltages of an initialization pulse INIT, a second EM pulse EM2, and a sensing pulse SENSE are gate-on voltages VGH and VEH, and the voltages of a scan pulse SCAN and a first EM pulse EM1 are gate-off voltages VGL and VEL. As shown in FIG. 12A, in the initialization step Ti, first, second, and fifth switch elements M11, M12, and M15 and the driving element DT are turned on, whereas third and fourth switch elements M13 and M14 are turned off. At this time, the initialization voltage Vinit is applied to the second node n2, and the reference voltage Vref is applied to the third node n3. At the same time, the pixel driving voltage ELVDD is applied to a first node n1.

The sensing pulse SENSE can rise to the gate-on voltage VGH before entering the initialization step Ti, and fall to the gate-off voltage VGL at the end of the initialization step Ti. Within the period of the pulse width of the sensing pulse SENSE, i.e., the gate-on voltage VGH section, the initialization pulse INIT is inverted from the gate-off voltage VGL to the gate-on voltage VGH, and the first EM pulse EM1 is inverted from the gate-on voltage VEH to the gate-off voltage VEL. The sensing pulse SENSE may be generated at a pulse width wider than that of the scan pulse SCAN. For example, the scan pulse SCAN has a pulse width of one horizontal period, whereas the sensing pulse SENSE may be generated in approximately two horizontal periods 2H.

Figure 12B:
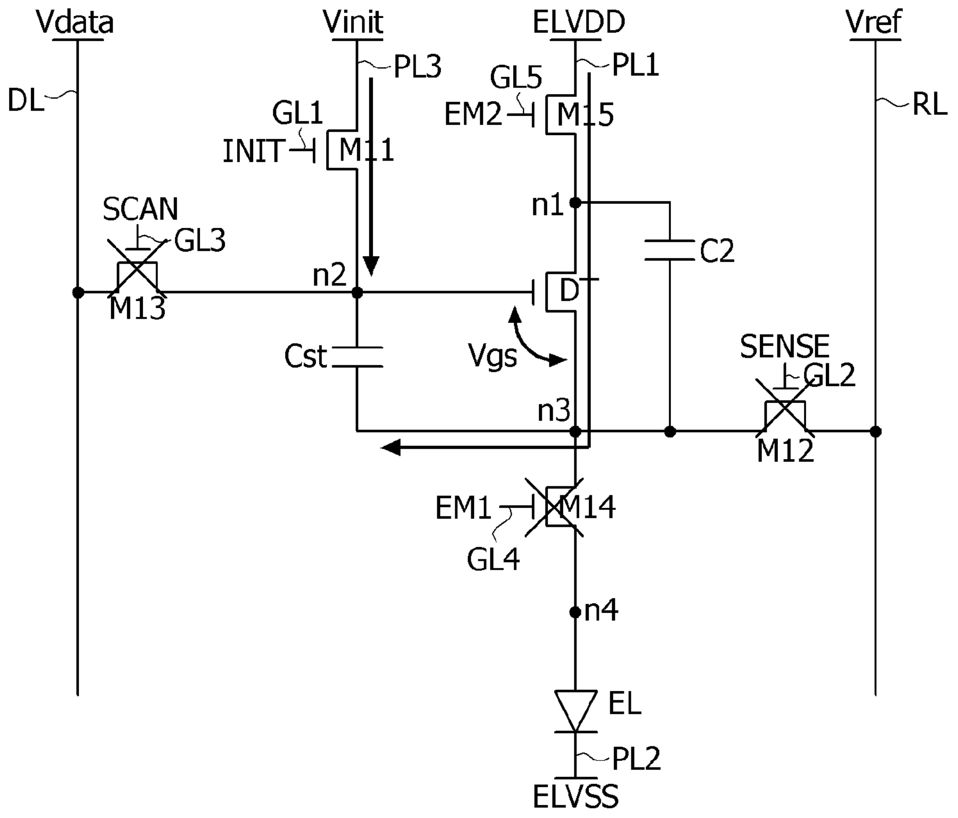

In the sensing step Ts, the initialization pulse INIT and the second EM pulse EM2 maintain the gate-on voltages VGH and VEH, and the scan pulse SCAN and the first EM pulse EM1 maintain the gate-off voltages VGL and VEL. In the sensing step Ts, the sensing pulse SENSE is inverted to the gate-off voltage VGL. As shown in FIG. 12B, in the sensing step Ts, the first and fifth switch elements M11 and M15 maintain the on state, whereas the third and fourth switch elements M13 and M14 maintain the off state. The second switch element M12 is turned off in the sensing step Ts. The driving element DT is turned off when the voltage at the third node n3 rises and thus the gate-source voltage Vgs reaches the threshold voltage Vth, and its threshold voltage Vth is stored in the first capacitor Cst.

In the data writing step Tw, the scan pulse SCAN synchronized with the data voltage Vdata of the pixel data is generated at the gate-on voltage VGH. The second EM pulse EM2 may maintain the gate-on voltage VEH or be inverted to the gate-off voltage VEL in the data writing step Tw. Accordingly, the fifth switch element M15 may maintain the on state or may be turned off in the data writing step Tw. When the second EM pulse EM2 maintains the gate-on voltage VEH in the data writing step Tw, the voltage at the third node n3 may be changed according to the mobility of the driving element DT, thereby compensating for a change or deviation in the mobility of the driving element DT.

Figure 12C:
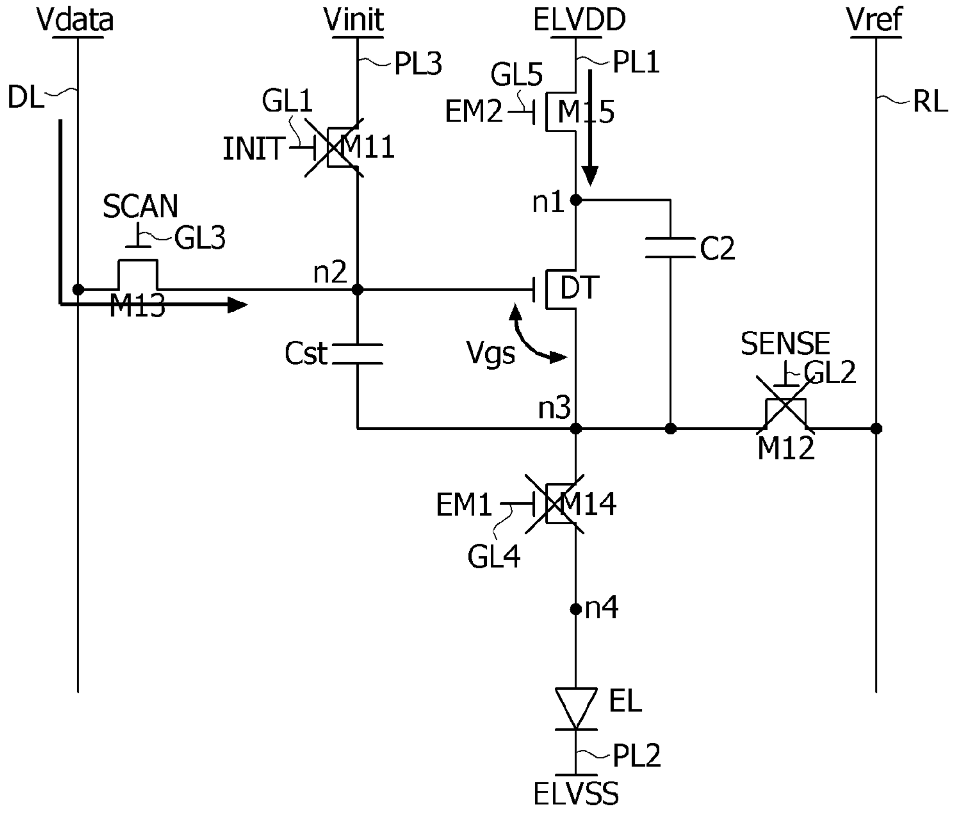

In the data writing step Tw, the voltages of the initialization pulse INIT, the first EM pulse EM1, and the sensing pulse SENSE are the gate-off voltages VGL and VEL. EM2 might also optionally be off as shown by the dashed line in FIG. 11. As shown in FIG. 12C, in the data writing step Tw, the third and fifth switch elements M13 and M15 are turned on, whereas the first, second, and fourth switch elements M11, M12, and M14 are turned off. The driving element DT may be turned on when the voltage at the second node n2 rises to the data voltage Vdata and thus the gate-source voltage Vgs becomes higher than the threshold voltage Vth.

Figure 12D:
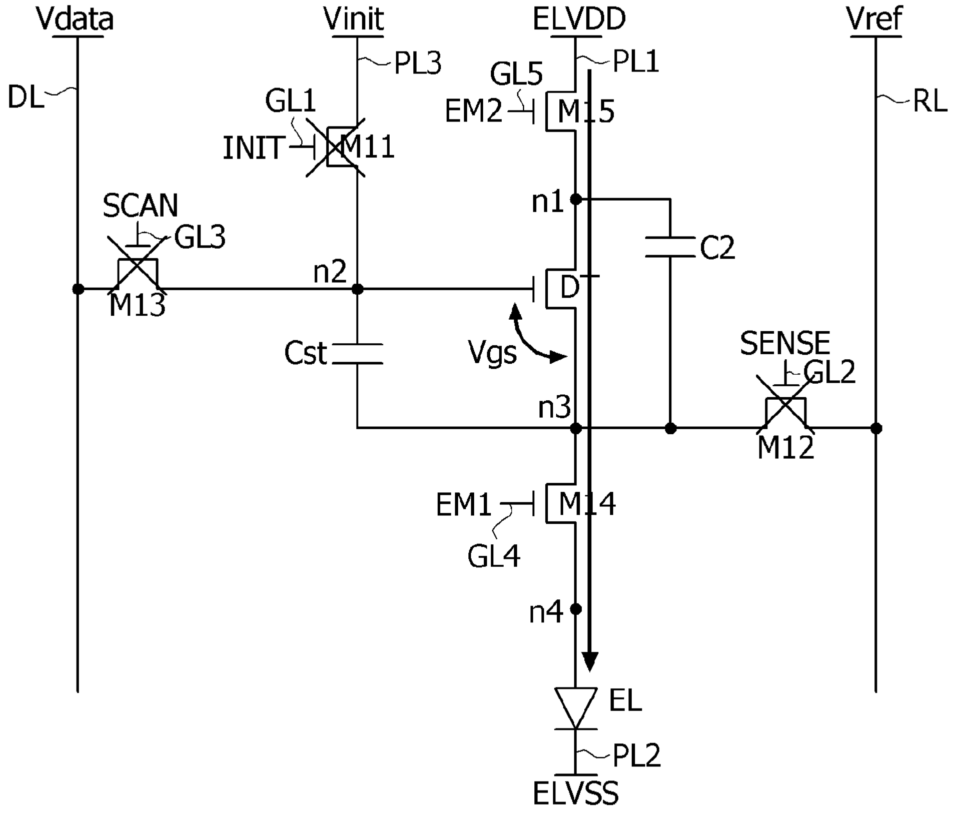

In the light emission step Tem, the voltages of the first and second EM pulses EM1 and EM2 are the gate-on voltage VEH, and the voltages of the other gate signals INIT, SENSE, and SCAN are the gate-off voltage VGL. As shown in FIG. 12D, in the light emission step Tem, the fourth and fifth switch elements M14 and M15 are turned on, whereas the first, second, and third switch elements M11, M12, and M13 are turned off. In the light emission step Tem, the pixel circuit operates as a source follower circuit, and thus a current is supplied to the light-emitting element EL according to the gate-source voltage Vgs of the driving element DT. At this time, the light-emitting element EL may emit light at a luminance corresponding to the value or the gray scale of the pixel data.

The first and second EM pulses EM1 and EM2 may swing between the gate-on voltage VEH and the gate-off voltage VEL in order to enhance low gray scale expression in the light emission step Tem. The first and second EM pulses EM1 and EM2 may swing at a duty ratio set to a preset PWM (Pulse Width Modulation) in the light emission step Tem.

A floating period Tf may be present as an option between the sensing step Ts and the data writing step Tw. During the floating period Tf, the gate signals INIT, SENSE, SCAN, and EM1 except for the second EM pulse EM2 are at the gate-off voltages VGL and VEL. Accordingly, the first to fourth switch elements M11 to M14 are turned off during the floating period Tf, and the second to fourth nodes n2 to n4 of the pixel circuit are turned into a floating state, thereby maintaining their previous voltages.

A boosting step Tboost may be present as an option between the data writing step Tw and the light emission step Tem. In the boosting step Tboost, the voltages of the first and second EM pulses EM1 and EM2 are the gate-on voltage VEH, and the voltages of the other gate signals INIT, SENSE, and SCAN are the gate-off voltage VGL. Accordingly, during the boosting step Tboost, the fourth and fifth switch elements M14 and M15 are turned on, and the other switch elements M11, M12, and M13 are turned off. During the boosting step Tboost, the voltages at the second and third nodes n2 and n3 rise.

The constant voltages ELVDD, ELVSS, Vinit, and Vref applied to the pixel circuit shown in FIG. 10 may be set as ELVDD>Vinit>ELVSS>Vref or ELVDD>Vinit>Vref>ELVSS, as shown in FIG. 7.

In the pixel circuit shown in FIG. 10, the light-emitting element EL may be implemented with an OLED. The OLED includes an organic compound layer formed between the anode electrode and the cathode electrode. The organic compound layer may include, but is not limited to, a hole injection layer HIL, a hole transport layer HTL, an emission layer EML, an electron transport layer ETL, and an electron injection layer EIL. The anode electrode of the light-emitting element EL is connected to the fourth node n4, and the cathode electrode is connected to the second power line PL2 to which the low-potential power supply voltage ELVSS is applied.

The driving element DT generates a current according to the gate-source voltage Vgs and thereby drives the light-emitting element EL. The driving element DT includes a first electrode connected to the first node n1, a gate electrode connected to the second node n2, and a second electrode connected to the third node n3.

The first capacitor Cst is connected between the second node n2 and the third node n3. The second capacitor C2 is connected between the first node n1 and the third node n3.

The first switch element M11 is turned on according to the gate-on voltage VGH of the initialization pulse INIT in the initialization step Ti and the sensing step Ts and applies the initialization voltage Vinit to the second node n2. The first switch element M11 includes a first electrode connected to the third power line PL3 to which the initialization voltage Vinit is applied, a gate electrode connected to a first gate line GL1 to which the initialization pulse INIT is applied, and a second electrode connected to the second node n2.

The second switch element M12 is turned on according to the gate-on voltage VGH of the sensing pulse SENSE in the initialization step Ti and connects the third node n3 or the fourth node n4 to the fourth power line RL to which the reference voltage Vref is applied. The second switch element M12 includes a first electrode connected to the third node n3 or the fourth node n4, a gate electrode connected to a second gate line GL2 to which the sensing pulse SENSE is applied, and a second electrode connected to the fourth power line RL.

The third switch element M13 is turned on according to the gate-on voltage VGH of the scan pulse SCAN synchronized with the data voltage Vdata in the data writing step Tw, and connects the data line DL to the second node n2. The data voltage Vdata is applied to the second node n2 in the data writing step Tw. The third switch element M13 includes a first electrode connected to the data line DL to which the data voltage Vdata is applied, a gate electrode connected to a third gate line GL3 to which the scan pulse SCAN is applied, and a second electrode connected to the second node n2.

The fourth switch element M14 is turned on according to the gate-on voltage VEH of the first EM pulse EM1 in the boosting step Tboost and the light emission step Tem, and connects the third node n3 to the fourth node n4. The fourth switch element M14 includes a first electrode connected to the third node n3, a gate electrode connected to a fourth gate line GL4 to which the first EM pulse EM1 is applied, and a second electrode connected to the fourth node n4.

The fifth switch element M15 is turned on according to the gate-on voltage VEH of the second EM pulse EM2 and may supply the pixel driving voltage ELVDD to the first node n1 in the initialization step Ti, the sensing step Ts, the floating period Tf, the data writing step Tw, the boosting step Tboost, and the light emission step Tem. In another embodiment, the fifth switch element M15 may be inverted to the gate-off voltage VEL in the data writing step Tw. The fifth switch element M15 includes a first electrode connected to the first power line PL1 to which the pixel driving voltage ELVDD is applied, a gate electrode connected to a fifth gate line GL5 to which the second EM pulse EM2 is applied, and a second electrode connected to the first node n1.

In the pixel circuit shown in FIG. 10, the fourth switch element M14 ensures that the ripple of the low-potential power supply voltage ELVSS and the voltage fluctuation of the light-emitting element EL do not affect the gate-source voltage Vgs of the driving element DT by separating the anode electrode of the light-emitting element EL and the third node n3. This pixel circuit facilitates the control of the threshold voltage compensation of the driving element DT and the improvement of image quality by separating the anode voltage of the light-emitting element EL and the reference voltage Vref. For example, by preventing the gate-source voltage Vgs of the driving element DT from changing according to the fluctuation of the anode voltage of the light-emitting element EL, crosstalk is reduced or does not occur in image patterns that might cause crosstalk, and any unevenness at low gray scale is not visually recognized by a user viewing the display.

Figure 13:
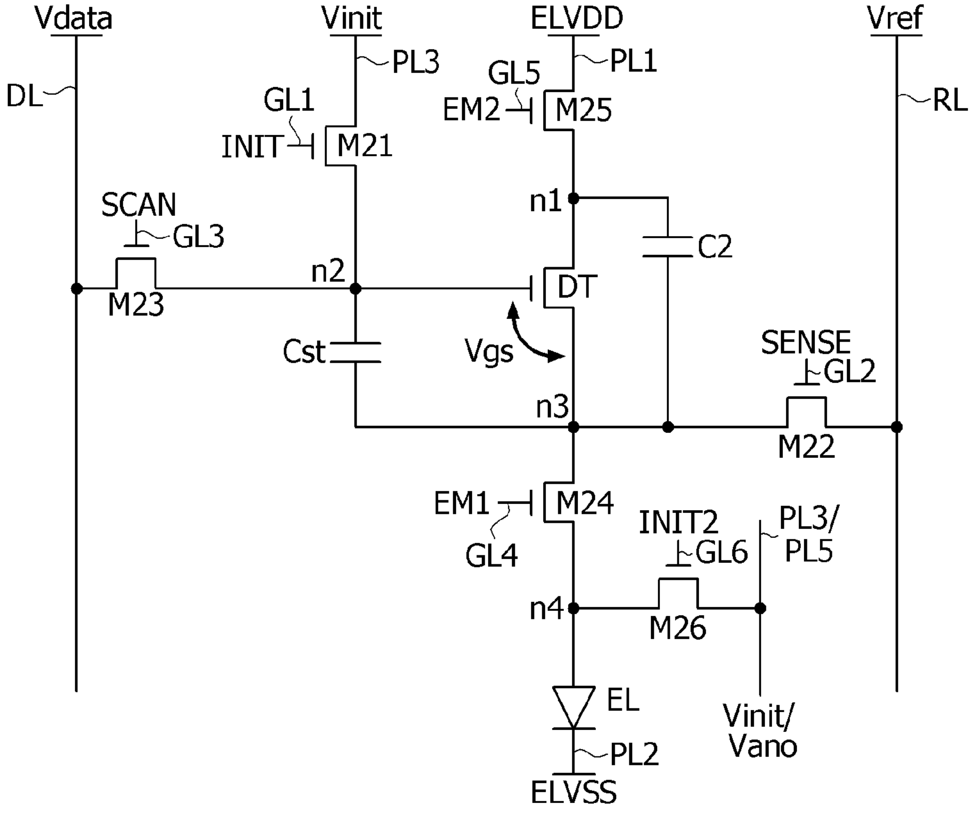
FIG. 13 is a circuit diagram showing a pixel circuit in accordance with a third embodiment of the present disclosure.
Figure 14:
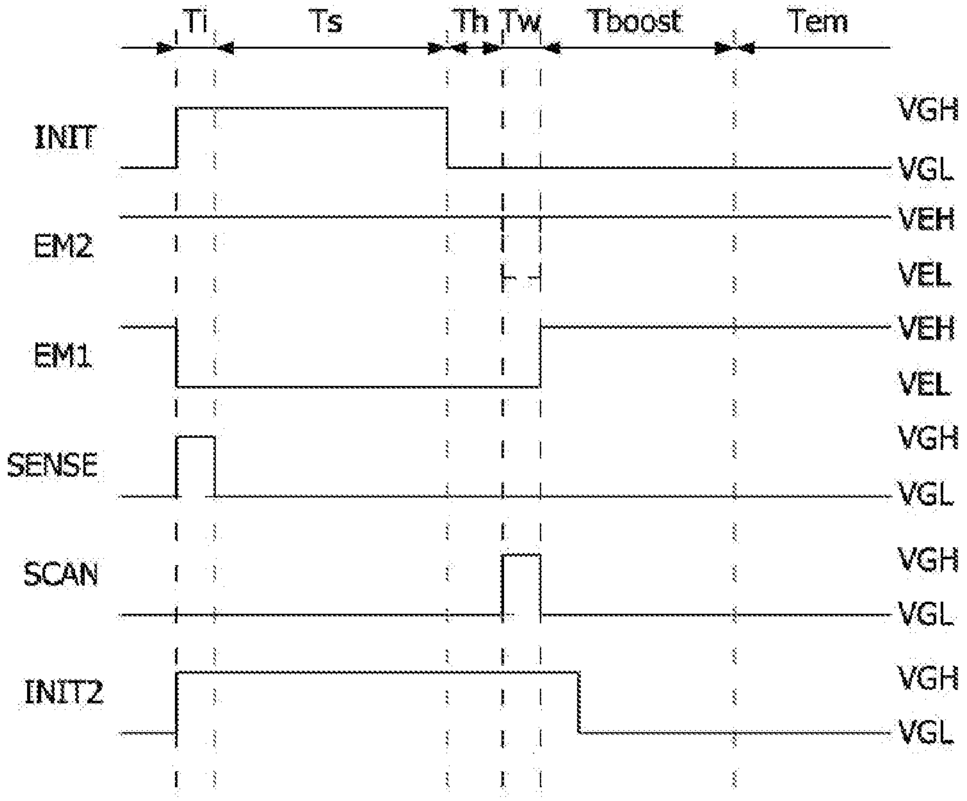
FIG. 14 is a waveform diagram showing gate signals applied to the pixel circuit shown in FIG. 13.
Figure 15:
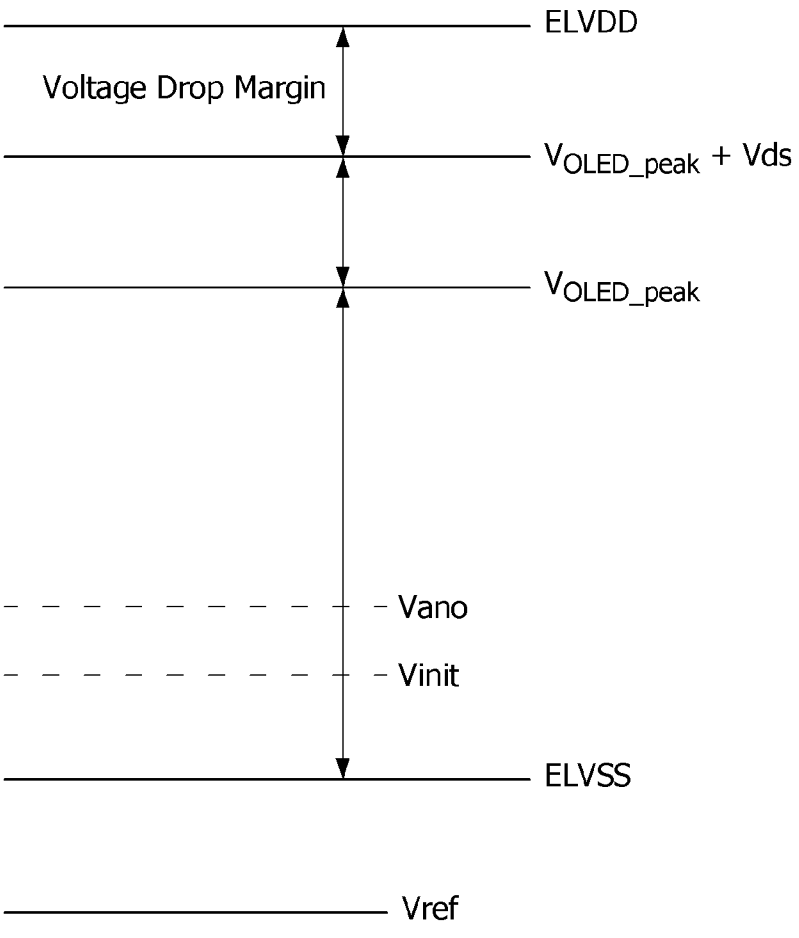
FIG. 15 is a diagram showing constant voltages applied to the pixel circuit shown in FIG. 13.

FIG. 13 is a circuit diagram showing a pixel circuit in accordance with a third embodiment of the present disclosure. FIG. 14 is a waveform diagram showing gate signals applied to the pixel circuit shown in FIG. 13. FIG. 15 is a diagram showing constant voltages applied to the pixel circuit shown in FIG. 13.

Referring to FIGS. 13 and 14, the pixel circuit includes a light-emitting element EL, a driving element DT for driving the light-emitting element EL, a plurality of switch elements M21 to M26, a first capacitor Cst, and a second capacitor C2. The driving element DT and the switch elements M21 to M26 may be implemented with n-channel oxide TFTs. But the embodiments of the present disclosure are not limited thereto. For example, at least one of the driving element DT and the switch elements M21 to M26 may be implemented with n-channel TFTs of other type or even p-channel TFTs.

This pixel circuit is connected to a first power line PL1 to which a pixel driving voltage ELVDD is applied, a second power line PL2 to which a low-potential power supply voltage ELVSS is applied, a third power line PL3 to which an initialization voltage Vinit is applied, a fourth power line RL to which a reference voltage Vref is applied, a data line DL to which a data voltage Vdata is applied, and gate lines GL1 to GL6 to which gate signals INIT, INIT2, SENSE, SCAN, EM1, and EM2 are applied. The pixel circuit may be connected to a fifth power line PL5 to which a preset anode voltage Vano is applied.

The constant voltages ELVDD, ELVSS, Vinit, Vref, and Vano applied to the pixel circuit may be set as ELVDD>Vano>Vinit>ELVSS>Vref or ELVDD>Vano>Vinit>Vref>ELVSS, including a voltage drop margin for the operation in the saturation region of the driving element DT, as shown in FIG. 15. In FIG. 15, $V_{OLED\_peak}$ is a peak voltage between both ends of the light-emitting element EL. In FIG. 15, 'Vds' is the drain-source voltage of the driving element DT. The gate-on voltages VGH and VEH may be set to voltages higher than the pixel driving voltage ELVDD, and the gate-off voltages VGL and VEL may be set to voltages lower than the low-potential power supply voltage ELVSS.

The pixel circuit may be driven in an initialization step Ti, a sensing step Ts, a data writing step Tw, and a light emission step Tem, as shown in FIG. 14. In the initialization step Ti, the pixel circuit is initialized. In the sensing step Ts, the threshold voltage Vth of the driving element DT is sensed and stored in the first capacitor Cst. In the data writing step Tw, the data voltage Vdata of pixel data is applied to a second node n2. After the voltages at the second and third nodes n2 and n3 rise in a boosting step Tboost, the light-emitting element EL may emit light at a luminance corresponding to the gray scale value of the pixel data in the light emission step Tem.

Figure 16A:
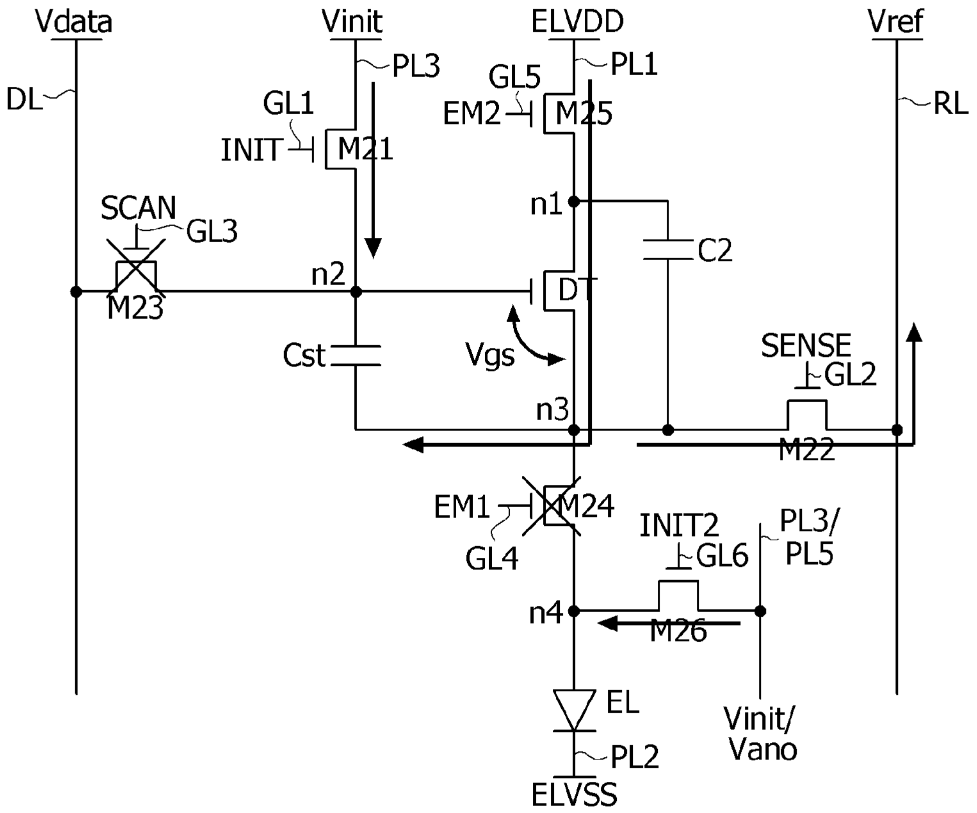
FIGS. 16A to 16D are circuit diagrams showing, in steps, the operation of the pixel circuit shown in FIG. 13.

In the initialization step Ti, the voltages of an initialization pulse INIT, a second initialization pulse INIT2, a second EM pulse EM2, and a sensing pulse SENSE are gate-on voltages VGH and VEH, and the voltages of a scan pulse SCAN and a first EM pulse EM1 are gate-off voltages VGL and VEL. As shown in FIG. 16A in the initialization step Ti, first, second, fifth, and sixth switch elements M21, M22, M25, and M26 and the driving element DT are turned on, whereas third and fourth switch elements M23 and M24 are turned off. At this time, the initialization voltage Vinit is applied to the second node n2, and the reference voltage Vref is applied to the third node n3. At the same time, the pixel driving voltage ELVDD is applied to a first node n1, and the initialization voltage Vinit or the anode voltage Vano is applied to a fourth node n4.

Figure 16B:
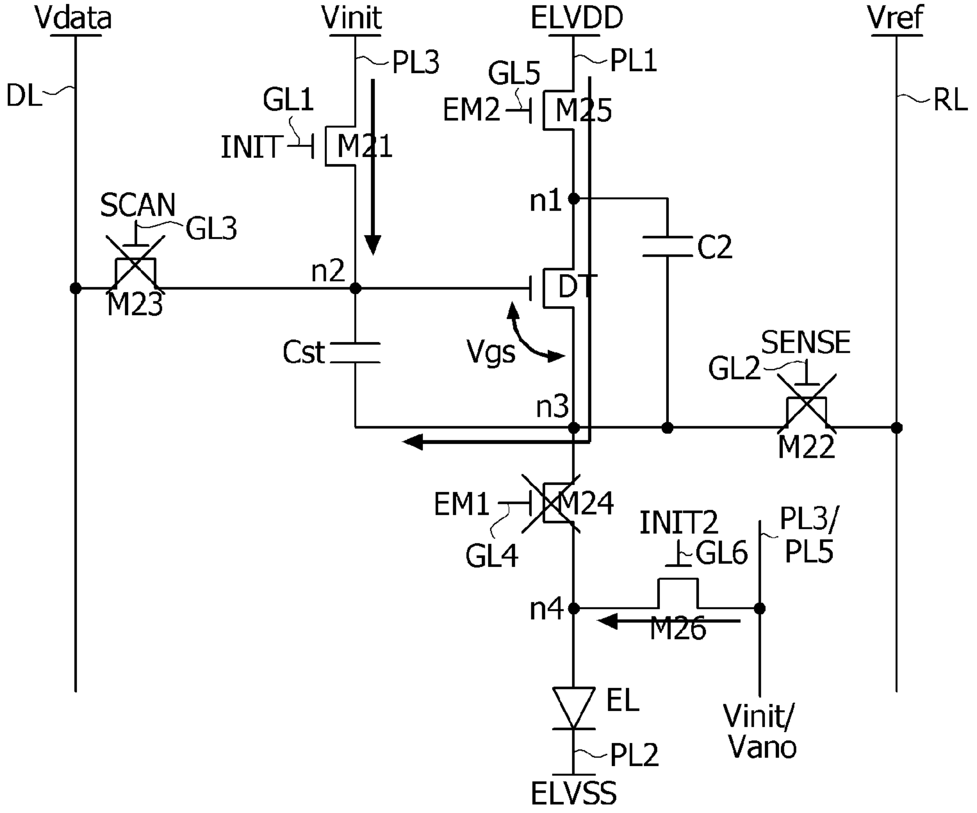

In the sensing step Ts, the initialization pulse INIT, the second initialization pulse INIT2, and the second EM pulse EM2 maintain the gate-on voltages VGH and VEH, and the scan pulse SCAN and the first EM pulse EM1 maintain the gate-off voltages VGL and VEL. In the sensing step Ts, the sensing pulse SENSE is inverted to the gate-off voltage VGL. As shown in FIG. 16B, in the sensing step Ts, the first, fifth, and sixth switch elements M21, M25, and M26 maintain the on state, whereas the third and fourth switch elements M23 and M24 maintain the off state. The second switch element M22 is turned off in the sensing step Ts. The driving element DT is turned off when the voltage at the third node n3 rises and thus the gate-source voltage Vgs reaches the threshold voltage Vth, and its threshold voltage Vth is stored in the first capacitor Cst.

In the data writing step Tw, the scan pulse SCAN synchronized with the data voltage Vdata of the pixel data is generated at the gate-on voltage VGH. In the data writing step Tw, the second initialization pulse INIT2 maintains the gate-on voltage VGH. The second EM pulse EM2 may maintain the gate-on voltage VGH or be inverted to the gate-off voltage VGL in the data writing step Tw. Accordingly, the fifth switch element M25 may maintain the on state or may be turned off in the data writing step Tw.

Figure 16C:
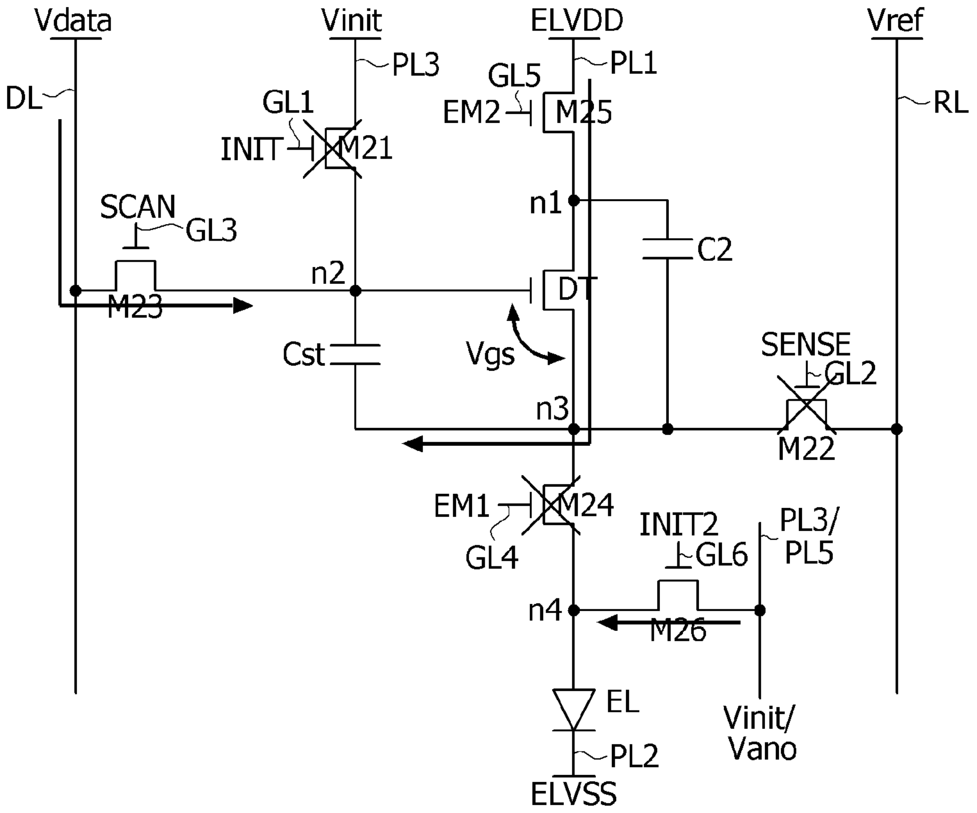

In the data writing step Tw, the voltages of the initialization pulse INIT, the first EM pulse EM1, and the sensing pulse SENSE are the gate-off voltages VGL and VEL. As shown in FIG. 16C, in the data writing step Tw, the third, fifth, and sixth switch elements M23, M25, and M26 are turned on, whereas the first, second, and fourth switch elements M21, M22, and M24 are turned off. The driving element DT may be turned on when the voltage at the second node n2 rises to the data voltage Vdata and thus the gate-source voltage Vgs becomes higher than the threshold voltage Vth.

Figure 16D:
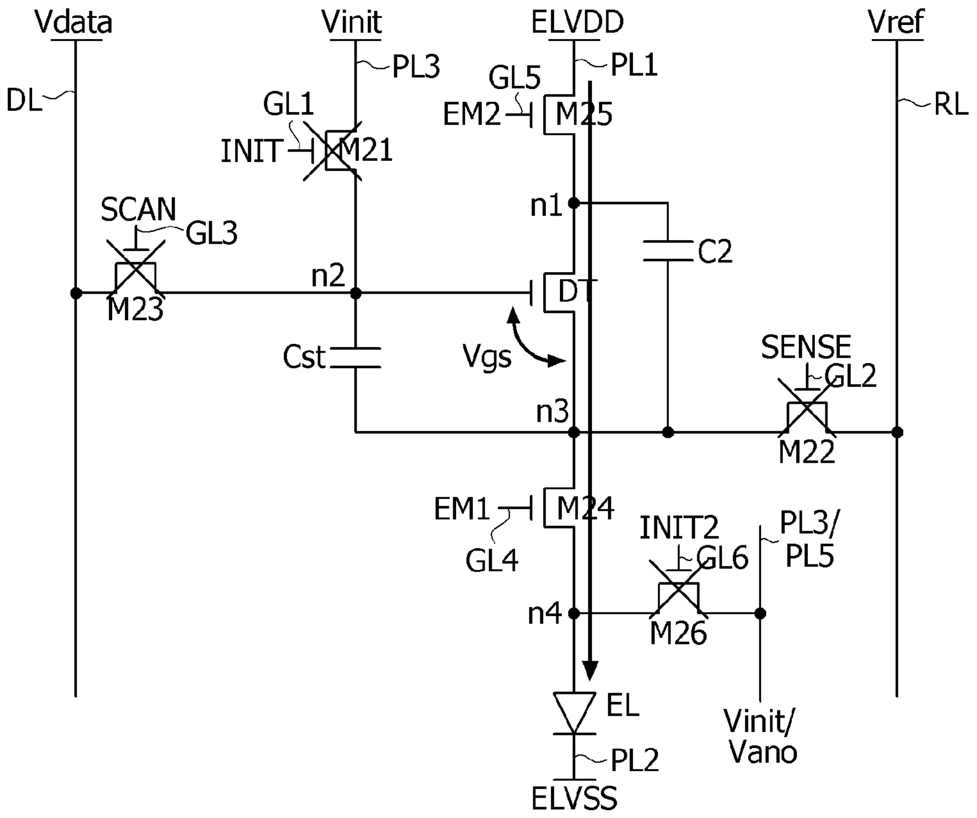

In the light emission step Tem, the voltages of the first and second EM pulses EM1 and EM2 are the gate-on voltage VEH, and the voltages of the other gate signals INIT, INIT2, SENSE, and SCAN are the gate-off voltage VGL. As shown in FIG. 16D, in the light emission step Tem, the fourth and fifth switch elements M24 and M25 are turned on, whereas the other switch elements M21, M22, M23, and M26 are turned off. In the light emission step Tem, the pixel circuit operates as a source follower circuit, and thus a current is supplied to the light-emitting element EL according to the gate-source voltage Vgs of the driving element DT. At this time, the light-emitting element EL may emit light at a luminance corresponding to the gray scale of the pixel data.

The first and second EM pulses EM1 and EM2 may swing between the gate-on voltage VEH and the gate-off voltage VEL in order to enhance low gray scale expression in the light emission step Tem. The first and second EM pulses EM1 and EM2 may swing at a duty ratio set to a preset PWM (Pulse Width Modulation) in the light emission step Tem.

A holding period Th may be present as an option between the sensing step Ts and the data writing step Tw. During the holding period Th, the voltages of the second initialization pulse INIT2 and the second EM pulse EM2 are the gate-on voltages VGH and VEH, and the other gate signals INIT, SENSE, SCAN, and EM1 are at the gate-off voltages VGL and VEL. During the holding period Th, the pixel driving voltage ELVDD is applied to the first node n1, and the initialization voltage Vinit or the anode voltage Vano is applied to the fourth node n4. During the holding period Th, the first to fourth switch elements M21 to M24 are turned off, and thus, the first to third nodes n1 to n3 are in a floating state.

A boosting step Tboost may be present as an option between the data writing step Tw and the light emission step Tem. In the boosting step Tboost, the voltages of the first and second EM pulses EM1 and EM2 are the gate-on voltage VEH, and the voltages of the other gate signals INIT, INIT2, SENSE, and SCAN are the gate-off voltage VGL. Accordingly, during the boosting step Tboost, the fourth and fifth switch elements M24 and M25 are turned on, and the other switch elements M21, M22, M23, and M26 are turned off. During the boosting step Tboost, the voltages at the second and third nodes n2 and n3 rise.

On the other hand, the second initialization pulse INIT2 may maintain the gate-on voltage VGH at the beginning of the boosting step Tboost and then be inverted to the gate-off voltage VGL. Accordingly, the initialization voltage Vinit or the anode voltage Vano may be applied to the fourth node n4 at the beginning of the boosting step Tboost.

In the pixel circuit shown in FIG. 13, the light-emitting element EL may be implemented with an OLED. The OLED includes an organic compound layer formed between the anode electrode and the cathode electrode. The organic compound layer may include, but is not limited to, a hole injection layer HIL, a hole transport layer HTL, an emission layer EML, an electron transport layer ETL, and an electron injection layer EIL. The anode electrode of the light-emitting element EL is connected to the fourth node n4, and the cathode electrode is connected to the second power line PL2 to which the low-potential power supply voltage ELVSS is applied.

The driving element DT generates a current according to the gate-source voltage Vgs and thereby drives the light-emitting element EL to emit light. The driving element DT includes a first electrode connected to the first node n1, a gate electrode connected to the second node n2, and a second electrode connected to the third node n3.

The first capacitor Cst is connected between the second node n2 and the third node n3. The second capacitor C2 is connected between the first node n1 and the third node n3.

The first switch element M21 is turned on according to the gate-on voltage VGH of the initialization pulse INIT in the initialization step Ti and the sensing step Ts and applies the initialization voltage Vinit to the second node n2. The first switch element M21 includes a first electrode connected to the third power line PL3 to which the initialization voltage Vinit is applied, a gate electrode connected to a first gate line GL1 to which the initialization pulse INIT is applied, and a second electrode connected to the second node n2.

The second switch element M22 is turned on according to the gate-on voltage VGH of the sensing pulse SENSE in the initialization step Ti and connects the third node n3 to the fourth power line RL to which the reference voltage Vref is applied. The second switch element M22 includes a first electrode connected to the third node n3, a gate electrode connected to a second gate line GL2 to which the sensing pulse SENSE is applied, and a second electrode connected to the fourth power line RL.

The third switch element M23 is turned on according to the gate-on voltage VGH of the scan pulse SCAN synchronized with the data voltage Vdata in the data writing step Tw, and connects the data line DL to the second node n2. The data voltage Vdata is applied to the second node n2 in the data writing step Tw. The third switch element M23 includes a first electrode connected to the data line DL to which the data voltage Vdata is applied, a gate electrode connected to a third gate line GL3 to which the scan pulse SCAN is applied, and a second electrode connected to the second node n2.

The fourth switch element M24 is turned on according to the gate-on voltage VEH of the first EM pulse EM1 in the boosting step Tboost and the light emission step Tem, and connects the third node n3 to the fourth node n4. The fourth switch element M24 includes a first electrode connected to the third node n3, a gate electrode connected to a fourth gate line GL4 to which the first EM pulse EM1 is applied, and a second electrode connected to the fourth node n4.

The fifth switch element M25 is turned on according to the gate-on voltage VEH of the second EM pulse EM2 and may supply the pixel driving voltage ELVDD to the first node n1 in the initialization step Ti, the sensing step Ts, the holding period Th, the data writing step Tw, the boosting step Tboost, and the light emission step Tem. In another embodiment, the fifth switch element M25 may be inverted to the gate-off voltage VEL in the data writing step Tw. The fifth switch element M25 includes a first electrode connected to the first power line PL1 to which the pixel driving voltage ELVDD is applied, a gate electrode connected to a fifth gate line GL5 to which the second EM pulse EM2 is applied, and a second electrode connected to the first node n1.

The sixth switch element M26 is turned on according to the gate-on voltage VGH of the second initialization pulse INIT2 and applies the initialization voltage Vinit1 or the anode voltage Vano to the fourth node n4 in the initialization step Ti, the sensing step Ts, the holding period Th, and the data writing step Tw. The sixth switch element M26 includes a first electrode connected to the fourth node n4, a gate electrode connected to a sixth gate line GL6 to which the second initialization pulse INIT2 is applied, and a second electrode connected to the third power line PL3 to which the initialization voltage Vinit is applied or the fifth power line PL5 to which the anode voltage Vano is applied. If the initialization voltage Vinit is applied to the fourth node n4 through the sixth switch element M26, the bezel areas BZ may be reduced and the design margin may be further secured as the number of power lines is reduced because the fifth power line PL5 is not required.

In the pixel circuit shown in FIG. 13, the fourth switch element M24 ensures that the ripple of the low-potential power supply voltage ELVSS and the voltage fluctuation of the light-emitting element EL do not affect the gate-source voltage Vgs of the driving element DT by separating the anode electrode of the light-emitting element EL and the third node n3. This pixel circuit facilitates the control of the threshold voltage compensation of the driving element DT and the improvement of image quality by separating the anode voltage of the light-emitting element EL and the reference voltage Vref.

Figure 17:
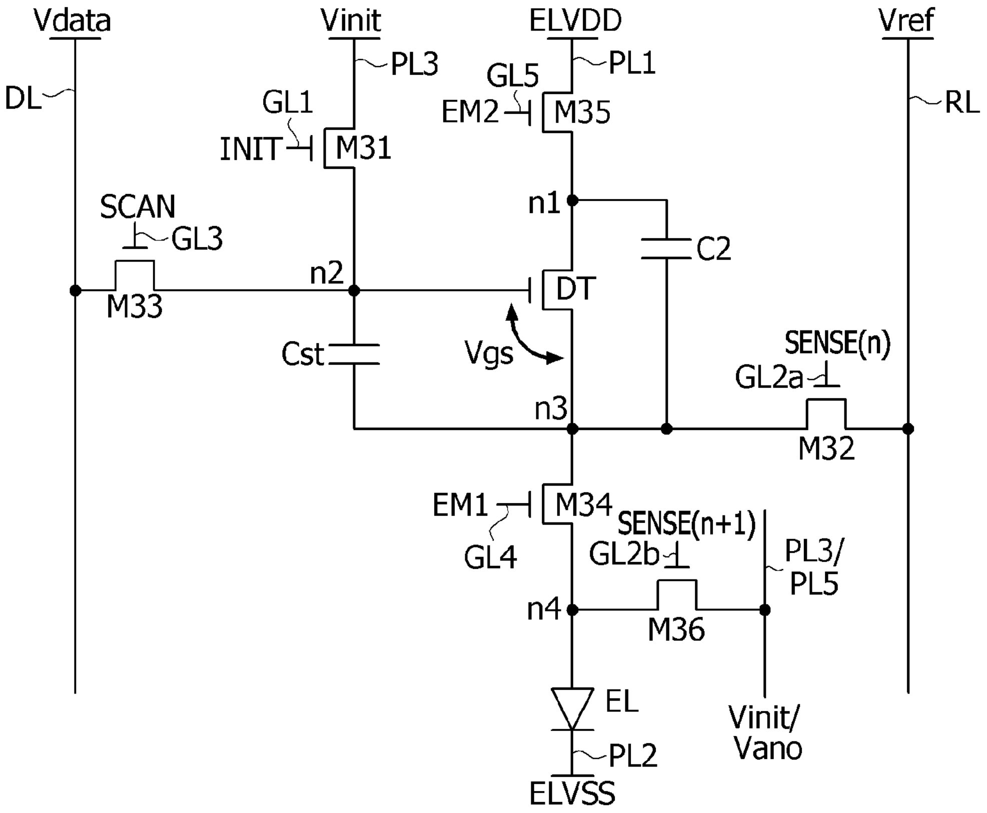
FIG. 17 is a circuit diagram showing a pixel circuit in accordance with a fourth embodiment of the present disclosure.
Figure 18:
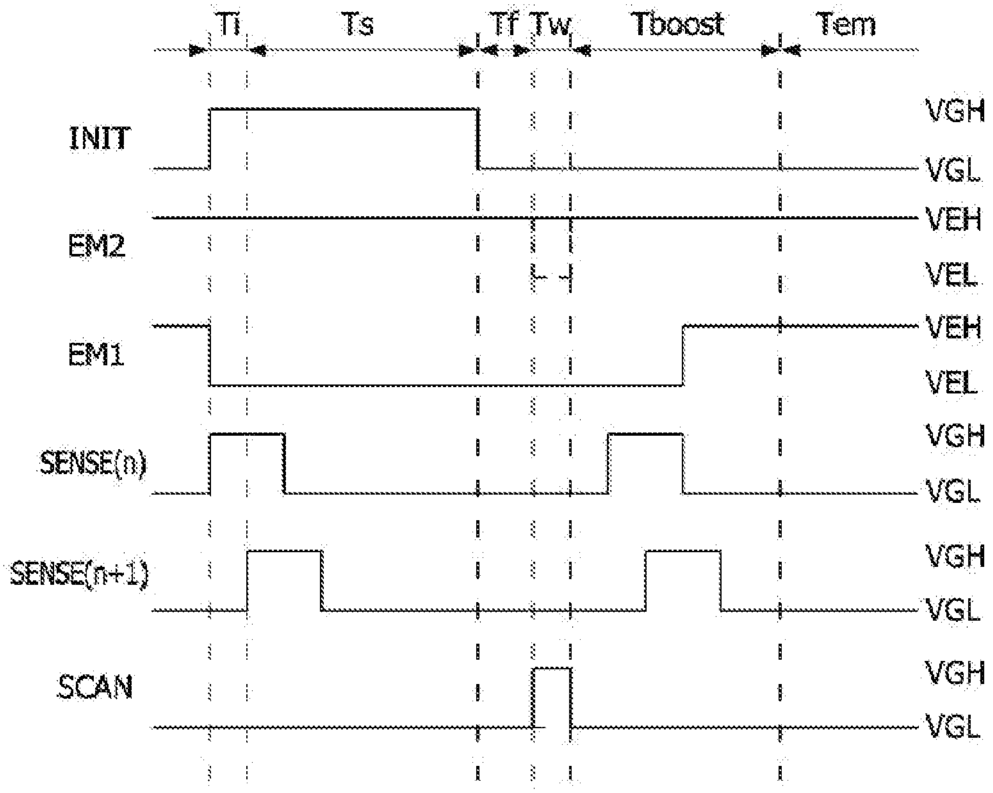
FIG. 18 is a waveform diagram showing gate signals applied to the pixel circuit shown in FIG. 17.

FIG. 17 is a circuit diagram showing a pixel circuit in accordance with a fourth embodiment of the present disclosure. FIG. 18 is a waveform diagram showing gate signals applied to the pixel circuit shown in FIG. 17. This pixel circuit is a pixel circuit of subpixels arranged in an nth (n is a natural number) pixel line.

Referring to FIGS. 17 and 18, the pixel circuit includes a light-emitting element EL, a driving element DT for driving the light-emitting element EL, a plurality of switch elements M31 to M36, a first capacitor Cst, and a second capacitor C2. The driving element DT and the switch elements M31 to M36 may be implemented with n-channel oxide TFTs.

This pixel circuit is connected to a first power line PL1 to which a pixel driving voltage ELVDD is applied, a second power line PL2 to which a low-potential power supply voltage ELVSS is applied, a third power line PL3 to which an initialization voltage Vinit is applied, a fourth power line RL to which a reference voltage Vref is applied, a data line DL to which a data voltage Vdata is applied, and gate lines GL1 to GL6 to which gate signals [INIT, SENSE(n), SENSE (n+1), SCAN, EM1, and EM2] are applied. The pixel circuit may be connected to a fifth power line PL5 to which a preset anode voltage Vano is applied. An (n+1)th sensing pulse [SENSE(n+1)] applied to the nth pixel line is applied to an (n+1)th pixel line as an nth sensing pulse [SENSE(n)]. The pulse widths of the sensing pulses [SENSE(n), SENSE(n+1)] may be set to pulse widths wider than that of the scan pulse SCAN. For example, the sensing pulses [SENSE(n), SENSE(n+1)] may be set to a pulse width of two horizontal periods, and the scan pulse SCAN may be set to a pulse width of one horizontal period. The (n+1)th sensing pulse [SENSE(n+1)] may be generated subsequent to the nth sensing pulse [SENSE(n)], and may overlap the nth sensing pulse [SENSE(n)] by approximately one horizontal period.

The constant voltages ELVDD, ELVSS, Vinit, Vref, and Vano applied to this pixel circuit are the same as those in FIG. 15.

The pixel circuit may be driven in an initialization step Ti, a sensing step Ts, a data writing step Tw, and a light emission step Tem, as shown in FIG. 18. In the initialization step Ti, the pixel circuit is initialized. In the sensing step Ts, the threshold voltage Vth of the driving element DT is sensed and stored in the first capacitor Cst. In the data writing step Tw, the data voltage Vdata of pixel data is applied to a second node n2. After the voltages at the second and third nodes n2 and n3 rise in a boosting step Tboost, the light-emitting element EL may emit light at a luminance corresponding to the gray scale value of the pixel data in the light emission step Tem.

Figure 19A:
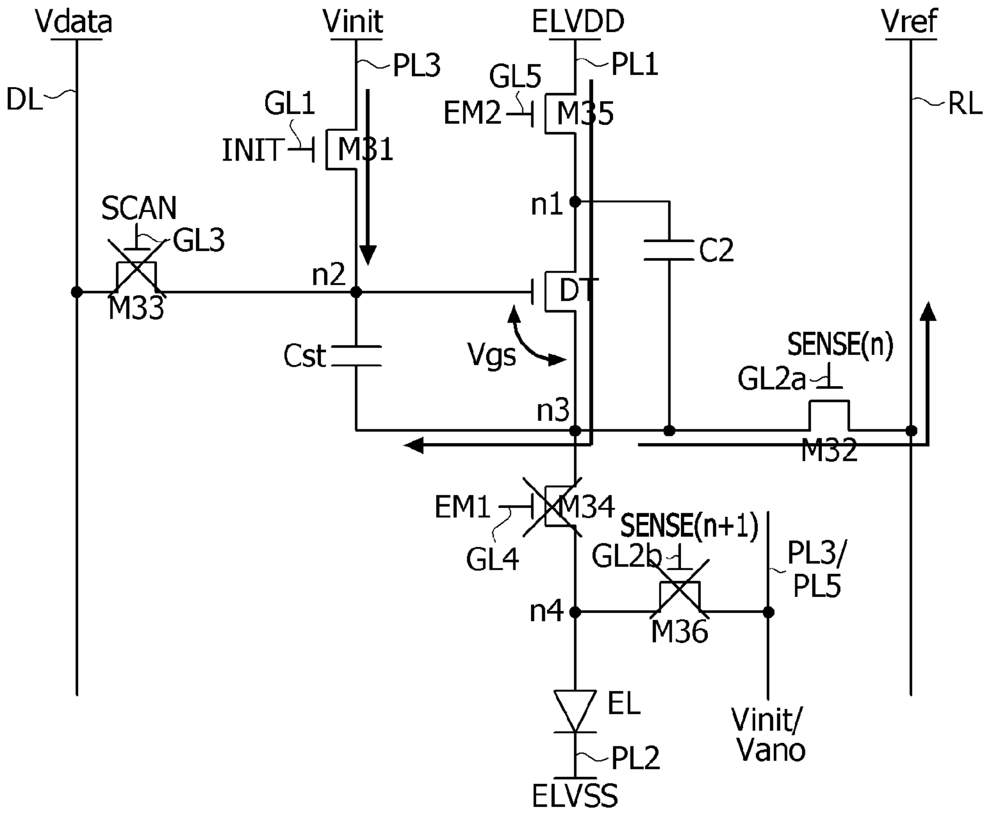
FIGS. 19A to 19D are circuit diagrams showing, in steps, the operation of the pixel circuit shown in FIG. 17.

In the initialization step Ti, the voltages of an initialization pulse INIT, a second EM pulse EM2, and the nth sensing pulse [SENSE(n)] are gate-on voltages VGH and VEH, and the voltages of the scan pulse SCAN, the (n+1)th sensing pulse [SENSE(n+1)], and a first EM pulse EM1 are gate-off voltages VGL and VEL. As shown in FIG. 19A, in the initialization step Ti, first, second, and fifth switch elements M31, M32, and M35 and the driving element DT are turned on, whereas third, fourth, and sixth switch elements M33, M34, and M36 are turned off. At this time, the initialization voltage Vinit is applied to the second node n2, and the reference voltage Vref is applied to the third node n3. At the same time, the pixel driving voltage ELVDD is applied to a first node n1.

Figure 19B:
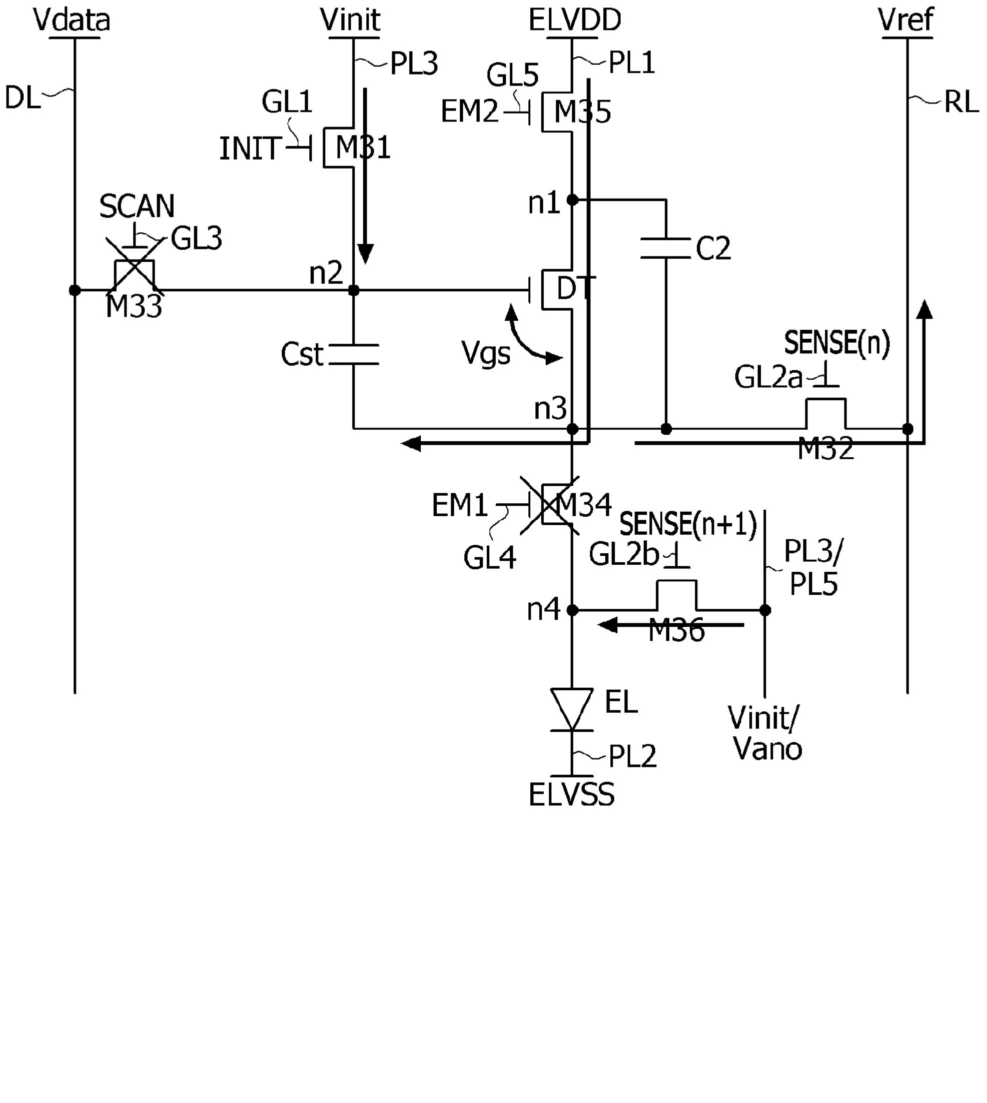

In the sensing step Ts, the initialization pulse INIT and the second EM pulse EM2 maintain the gate-on voltages VGH and VEH, and the scan pulse SCAN and the first EM pulse EM1 maintain the gate-off voltages VGL and VEL. The nth sensing pulse [SENSE(n)] and the (n+1)th sensing pulse [SENSE(n+1)] are generated at the gate-on voltage VGH at the beginning of the sensing step Ts, and then are inverted to the gate-off voltage VGL. As shown in FIG. 19B, in the sensing step Ts, the first, second, fifth, and sixth switch elements M31, M32, M35, and M36 are turned on, whereas the third and fourth switch elements M33 and M34 are turned off. The driving element DT is turned off when the voltage at the third node n3 rises and thus the gate-source voltage Vgs reaches the threshold voltage Vth, and its threshold voltage Vth is stored in the first capacitor Cst.

In the data writing step Tw, the scan pulse SCAN synchronized with the data voltage Vdata of the pixel data is generated at the gate-on voltage VGH. The second EM pulse EM2 may maintain the gate-on voltage VGH or be inverted to the gate-off voltage VGL in the data writing step Tw. Accordingly, the fifth switch element M35 may maintain the on state or may be turned off in the data writing step Tw.

Figure 19C:
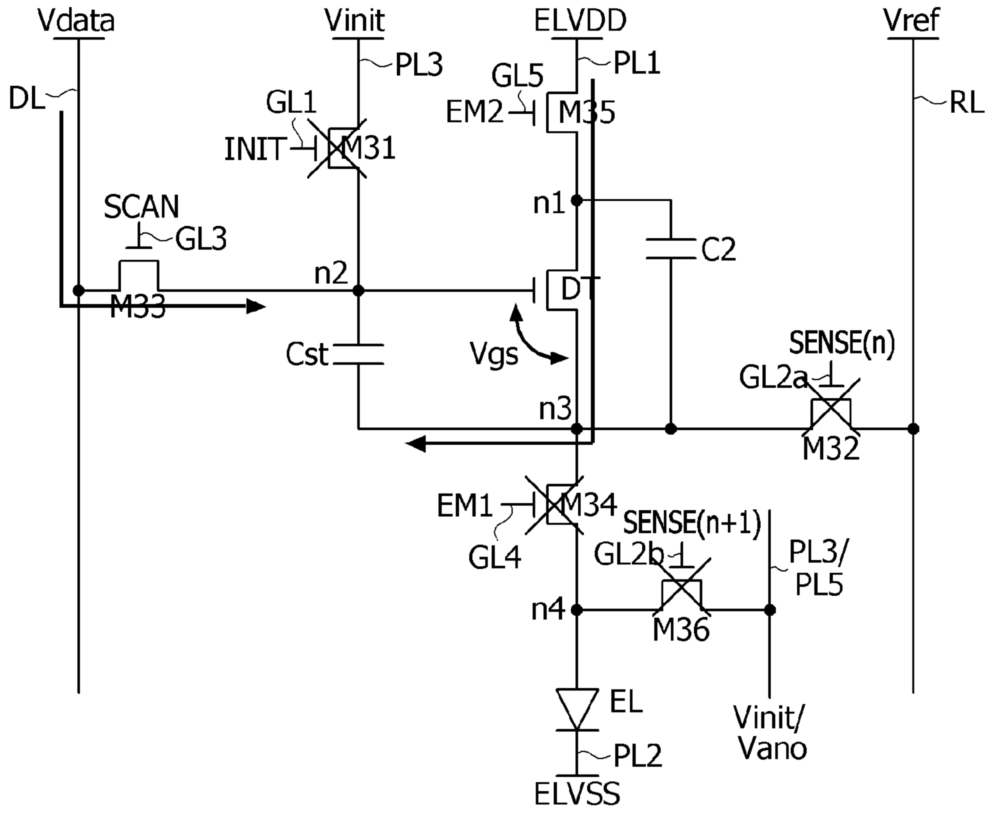

In the data writing step Tw, the voltages of the initialization pulse INIT, the first EM pulse EM1, the nth sensing pulse [SENSE(n)], and the (n+1)th sensing pulse [SENSE (n+1)] are the gate-off voltages VGL and VEL. As shown in FIG. 19C, in the data writing step Tw, the third and fifth switch elements M33 and M35 are turned on, whereas the other switch elements M31, M32, M34, and M36 are turned off. The driving element DT may be turned on when the voltage at the second node n2 rises by the data voltage Vdata and thus the gate-source voltage Vgs becomes higher than the threshold voltage Vth.

Figure 19D:
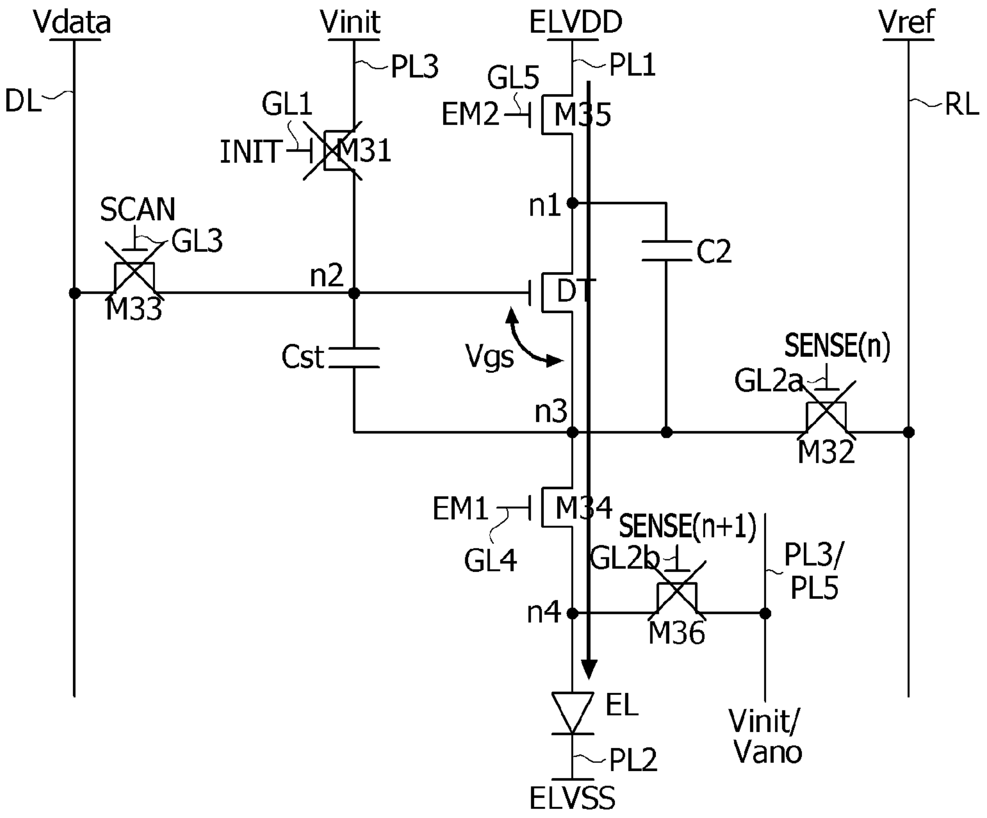

In the light emission step Tem, the voltages of the first and second EM pulses EM1 and EM2 are the gate-on voltage VEH, and the voltages of the other gate signals [INIT, SENSE(n), SENSE(n+1), SCAN] are the gate-off voltage VGL. As shown in FIG. 19D, in the light emission step Tem, the fourth and fifth switch elements M34 and M35 are turned on, whereas the other switch elements M31, M32, M33, and M36 are turned off. In the light emission step Tem, the pixel circuit operates as a source follower circuit, and thus a current is supplied to the light-emitting element EL according to the gate-source voltage Vgs of the driving element DT. At this time, the light-emitting element EL may emit light at a luminance corresponding to the gray scale of the pixel data.

The first and second EM pulses EM1 and EM2 may swing between the gate-on voltage VEH and the gate-off voltage VEL in order to enhance low gray scale expression in the light emission step Tem. The first and second EM pulses EM1 and EM2 may swing at a duty ratio set to a preset PWM (Pulse Width Modulation) in the light emission step Tem.

A floating period Tf may be present as an option between the sensing step Ts and the data writing step Tw. During the floating period Tf, the voltage of the second EM pulse EM2 is the gate-on voltages VEH, and the other gate signals [INIT, SENSE(n), SENSE(n+1), SCAN, EM1] are at the gate-off voltages VGL and VEL. Accordingly, during the floating period Tf, the switch elements M31 to M34 and M36 other than the fifth switch element M35 are turned off, and the second to fourth nodes n2, n3, and n4 turn into be floating, thereby maintaining their previous voltages.

A boosting step Tboost may be present as an option between the data writing step Tw and the light emission step Tem. In the boosting step Tboost, the voltages of the EM pulses EM1 and EM2 and the sensing pulses [SENSE(n), SENSE(n+1)] are the gate-on voltages VEH and VGH, and the initialization pulse INIT and the scan pulse SCAN are at the gate-off voltages VGL. Accordingly, during the boosting step Tboost, the second, fourth, fifth, and sixth switch elements M32, M34, M35, and M36 are turned on, and the first and third switch elements M31 and M33 are turned off. During the boosting step Tboost, the voltages at the second and third nodes n2 and n3 rise.

In the pixel circuit shown in FIG. 17, the light-emitting element EL may be implemented with an OLED. The OLED includes an organic compound layer formed between the anode electrode and the cathode electrode. The organic compound layer may include, but is not limited to, a hole injection layer HIL, a hole transport layer HTL, an emission layer EML, an electron transport layer ETL, and an electron injection layer EIL. The anode electrode of the light-emitting element EL is connected to the fourth node n4, and the cathode electrode is connected to the second power line PL2 to which the low-potential power supply voltage ELVSS is applied.

The driving element DT generates a current according to the gate-source voltage Vgs and thereby drives the light-emitting element EL. The driving element DT includes a first electrode connected to the first node n1, a gate electrode connected to the second node n2, and a second electrode connected to the third node n3.

The first capacitor Cst is connected between the second node n2 and the third node n3. The second capacitor C2 is connected between the first node n1 and the third node n3.

The first switch element M31 is turned on according to the gate-on voltage VGH of the initialization pulse INIT in the initialization step Ti and the sensing step Ts and applies the initialization voltage Vinit to the second node n2. The first switch element M31 includes a first electrode connected to the third power line PL3 to which the initialization voltage Vinit is applied, a gate electrode connected to a first gate line GL1 to which the initialization pulse INIT is applied, and a second electrode connected to the second node n2.

The second switch element M32 is turned on according to the gate-on voltage VGH of the nth sensing pulse [SENSE (n)] in the sensing step Ts and connects the third node n3 to the fourth power line RL to which the reference voltage Vref is applied. The second switch element M32 includes a first electrode connected to the third node n3, a gate electrode connected to a second-first gate line GL2*a* to which the nth sensing pulse [SENSE(n)] is applied, and a second electrode connected to the fourth power line RL.

The third switch element M33 is turned on according to the gate-on voltage VGH of the scan pulse SCAN synchronized with the data voltage Vdata in the data writing step Tw, and connects the data line DL to the second node n2. The data voltage Vdata is applied to the second node n2 in the data writing step Tw. The third switch element M33 includes a first electrode connected to the data line DL to which the data voltage Vdata is applied, a gate electrode connected to a third gate line GL3 to which the scan pulse SCAN is applied, and a second electrode connected to the second node n2.

The fourth switch element M34 is turned on according to the gate-on voltage VEH of the first EM pulse EM1 in the boosting step Tboost and the light emission step Tem, and connects the third node n3 to the fourth node n4. The fourth switch element M34 includes a first electrode connected to the third node n3, a gate electrode connected to a fourth gate line GL4 to which the first EM pulse EM1 is applied, and a second electrode connected to the fourth node n4.

The fifth switch element M35 is turned on according to the gate-on voltage VEH of the second EM pulse EM2 and may supply the pixel driving voltage ELVDD to the first node n1 in the initialization step Ti, the sensing step Ts, the floating period Tf, the data writing step Tw, the boosting step Tboost, and the light emission step Tem. In another embodiment, the fifth switch element M35 may be inverted to the gate-off voltage VEL in the data writing step Tw. The fifth switch element M35 includes a first electrode connected to the first power line PL1 to which the pixel driving voltage ELVDD is applied, a gate electrode connected to a fifth gate line GL5 to which the second EM pulse EM2 is applied, and a second electrode connected to the first node n1.

The sixth switch element M36 is turned on according to the gate-on voltage VGH of the (n+1)th sensing pulse [SENSE(n+1)] and applies the initialization voltage Vinit1 or the anode voltage Vano to the fourth node n4 in the sensing step Ts and the boosting step Tboost. The sixth switch element M36 includes a first electrode connected to the fourth node n4, a gate electrode connected to a second-second gate line GL2*b* to which the (n+1)th sensing pulse [SENSE(n+1)] is applied, and a second electrode connected to the third power line PL3 to which the initialization voltage Vinit is applied or to the fifth power line PL5 to which the anode voltage Vano is applied. If the initialization voltage Vinit is applied to the fourth node n4 through the sixth switch element M36, the bezel areas BZ may be reduced and the design margin may be further secured as the number of power lines is reduced because the fifth power line PL5 is not required.

Since the (n+1)th sensing pulse [SENSE(n+1)] is applied to the sixth switch element M36, the number of gate lines may be reduced compared to the pixel circuit shown in FIG. 13, and the bezel areas may be reduced.

In the pixel circuit shown in FIG. 17, the fourth switch element M34 ensures that the ripple of the low-potential power supply voltage ELVSS and the voltage fluctuation of the light-emitting element EL do not affect the gate-source voltage Vgs of the driving element DT by separating the anode electrode of the light-emitting element EL and the third node n3. This pixel circuit facilitates the control of the threshold voltage compensation of the driving element DT and the improvement of image quality by separating the anode voltage of the light-emitting element EL and the reference voltage Vref.

Figure 20:
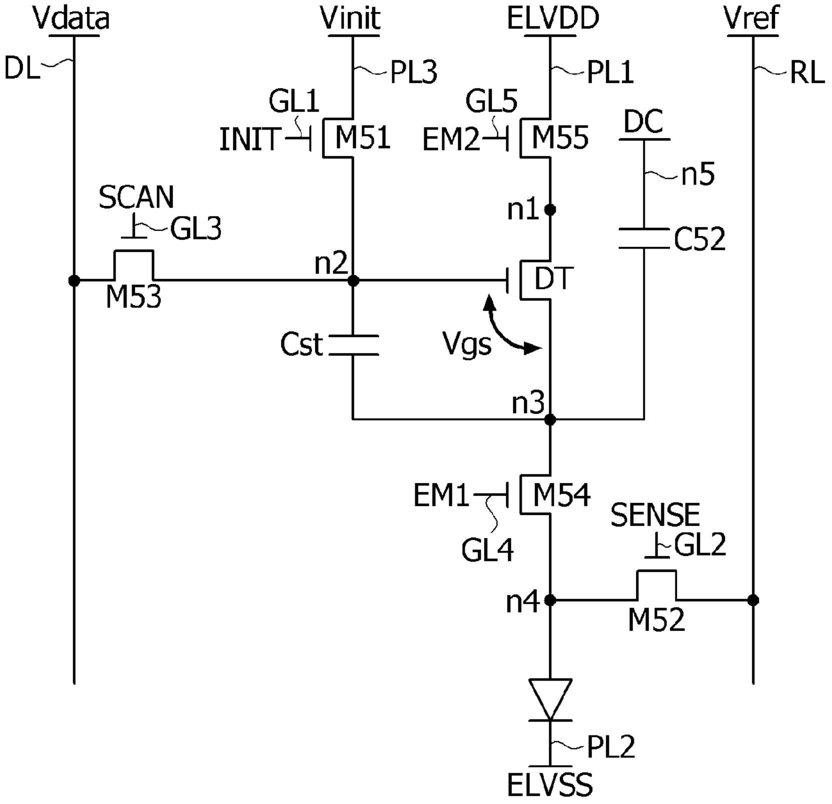
FIG. 20 is a circuit diagram showing a pixel circuit according to a fifth embodiment of the present disclosure.
Figure 21:
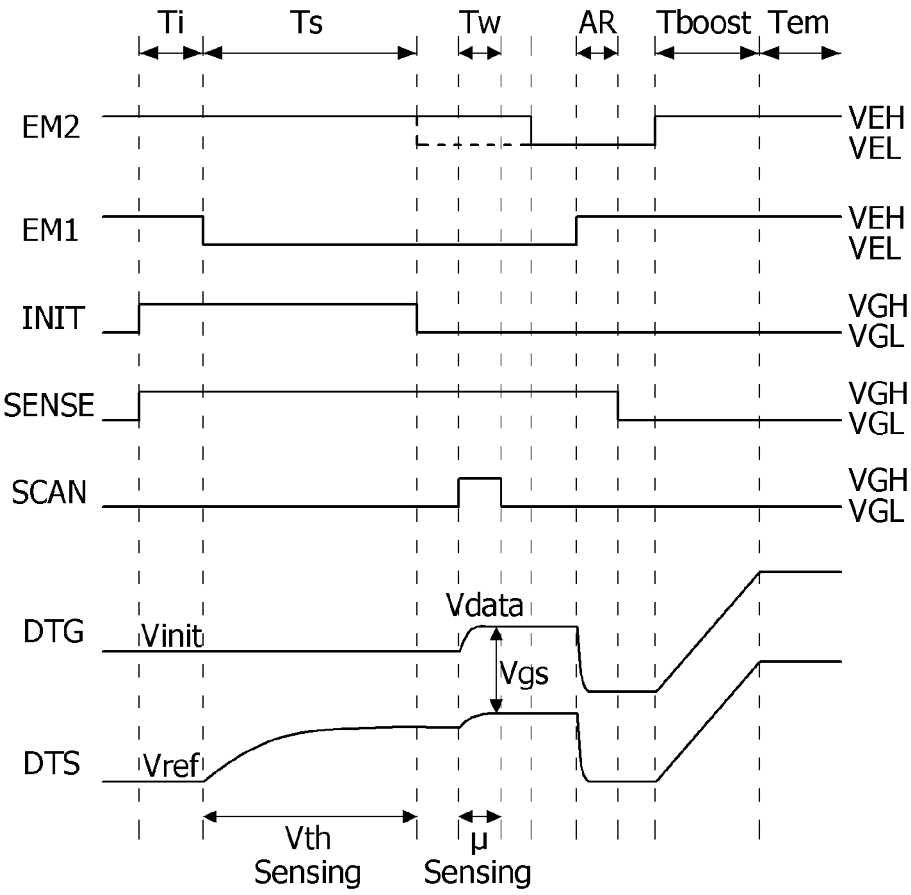
FIGS. 21 and 22 are waveform diagrams showing a gate signal applied to the pixel circuit shown in FIG. 20.
Figure 22:
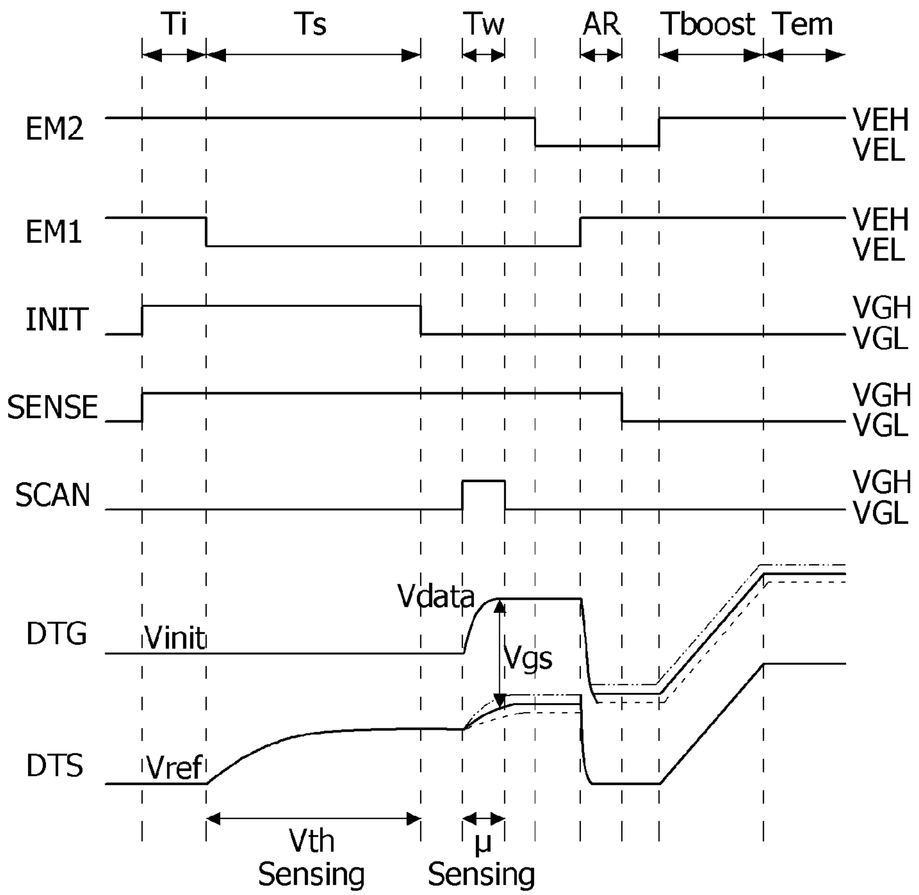

FIG. 20 is a circuit diagram showing a pixel circuit according to a fifth embodiment of the present disclosure; and FIGS. 21 and 22 are waveform diagrams showing a gate signal applied to the pixel circuit shown in FIG. 20. In FIGS. 21 and 22, "DTG" is a voltage at a second node n2, and "DTS" is a voltage at a third node n3.

Referring to FIGS. 20 to 22, the pixel circuit includes a light-emitting element EL, a driving element DT for driving the light-emitting element EL, a plurality of switch elements M51 to M55, a first capacitor Cst, and a second capacitor C2. The driving element DT and the switch elements M51 to M55 may be implemented as n-channel oxide TFTs.

This pixel circuit is connected to a first power line PL1 to which a pixel driving voltage ELVDD is applied, a second power line PL2 to which a low-potential power supply voltage ELVSS is applied, a third power line PL3 to which an initialization voltage Vinit is applied, a fourth power line RL to which a reference voltage Vref is applied, a data line DL to which a data voltage Vdata is applied, and gate lines GL1 to GL5 to which gate signals INIT, SENSE, SCAN, EM1, and EM2 are applied.

The pixel circuit may be driven in an initialization step Ti, a sensing step Ts, a data writing step Tw, and a light emission step Tem, as shown in FIG. 21. A boosting step Tboost in which the voltages at the second and third nodes n2 and n3 rise may be set between the data writing step Tw and the light emission step Tem. In order to prevent the flicker from being visually recognized by a user in the low-speed driving mode, an anode reset step AR may be set between the data writing step Tw and the boosting step Tboost.

In the initialization step Ti, the voltages of an initialization pulse INIT, a first EM pulse EM1, a second EM pulse EM2, and a sensing pulse SENSE are gate-on voltages VGH and VEH, and the voltage of a scan pulse SCAN is gate-off voltage VGL. Therefore, in the initialization step Ti, the first, second, fourth, and fifth switch elements M51, M52, M54, and M55 and the driving element DT are turned on, whereas the third switch element M53 is turned off. In this case, the initialization voltage Vinit is applied to the second node n2, and the reference voltage Vref is applied to the third node n3. At the same time, the pixel driving voltage ELVDD is applied to a first node n1.

In the sensing step Ts, the initialization pulse INIT, the sensing pulse SENSE, and the second EM pulse EM2 maintain the gate-on voltages VGH and VEH, and the scan pulse SCAN maintains the gate-off voltage VGL. The first EM pulse EM1 is inverted to the gate-off voltage VEL in the sensing step Ts. In the sensing step Ts, the first, second and fifth switch elements M51, M52 and M55 maintain the on state, whereas the third and fourth switch elements M53 and M54 are turned off. In the sensing step Ts, since the fourth switch element M54 is turned off and the second switch element M52 is turned on, the current path between the third node n3 and a fourth node n4 is cut off, and the reference voltage Vref is applied to an anode electrode of the light emitting element EL. Accordingly, residual charges in the light emitting element EL may be removed, and a ripple of the low-potential power supply voltage ELVSS may be prevented from affecting the anode electrode of the light emitting element EL and the third node n3.

In the sensing step Ts, as shown in FIG. 21, when the voltage DTS at the third node n3 rise and thus the voltage between the second and third nodes n2 and n3, that is, the gate-source voltage Vgs of the driving element DT reaches a threshold voltage Vth, the driving element DT is turned off and the threshold voltage is stored in the capacitor Cst.

In the data writing step Tw, the scan pulse SCAN synchronized with the data voltage Vdata of the pixel data is generated at the gate-on voltage VGH and the sensing pulse SENSE is generated at the gate-on voltage VGH. In the data writing step Tw, the data voltage Vdata is applied to the second node n2 to rise the voltages at the second and third nodes n2 and n3. The second EM pulse EM2 may maintain the gate-on voltage VEH or be inverted to the gate-off voltage VEL in the data writing step Tw. Accordingly, in the data writing step Tw, the second and third switch elements M52 and M53 may be turned on, and the fifth switch element M55 may maintain an on state or may be turned off.

When the second EM pulse EM2 maintains the gate-on voltage VEH in the data writing step Tw, the voltage at the third node n3 may be changed according to mobility of the driving element DT, thereby compensating for a change or deviation in the mobility of the driving element DT. For example, when the mobility of the driving element DT is high within the duration of the data writing step Tw as shown in FIG. 22, the voltage DTS at the third node n3 is increased, and thus the gate-source voltage Vgs of the driving element DT is decreased. On the other hand, when the mobility of the driving element DT is relatively lower, the voltage DTS at the third node n3 is decreased and the gate-source voltage Vgs of the driving element DT is increased. Accordingly, a change or deviation in mobility of the driving element DT may be compensated in the data writing step Tw.

In the data writing step Tw, the initialization pulse INIT and the first EM pulse EM1 are at the gate-off voltages VGL and VEL. In the data writing step Tw, the first and fourth switch elements M51 and M54 are turned off.

In the anode reset step AR, the first EM pulse EM1 and the sensing pulse SENSE are generated at the gate-on voltages VGH and VEH, whereas the second EM pulse EM2, the initialization pulse INIT, and the scan pulse SCAN are at the gate-off voltages VGL and VEL. Therefore, the second and fourth switch elements M52 and M54 are turned on to supply the reference voltage Vref to the third and fourth nodes n3 and n4 in the anode reset step AR. In the anode reset step AR, the first, third, and fifth switch elements M51, M53, and M55 are turned off.

In the boosting step Tboost, the first and second EM pulses EM1 and EM2 are generated at the gate-on voltage VEH, and the other gate signals INIT, SENSE, and SCAN are generated at the gate-off voltage VGL. In the boosting step Tboost, the fourth and fifth switch elements M54 and M55 are turned on, whereas the first, second, and third switch elements M51, M52, and M53 are turned off. In the boosting step Tboost, the voltages DTG and DTS at the second and third nodes n2 and n3 rise to the turn-on voltage of the light emitting element EL, and in this case, the capacitor (Cel in FIG. 3) of the light-emitting element EL is charged.

In the light emission step Tem, the voltages of the first and second EM pulses EM1 and EM2 maintains the gate-on voltage VEH, and the voltages of the other gate signals INIT, SENSE, and SCAN maintain the gate-off voltage VGL. In the light emission step Tem, the fourth and fifth switch elements M54 and M55 are turned on, whereas the first, second, and third switch elements M51, M52, and M53 are turned off. In the light emission step Tem, the pixel circuit operates as a source follower circuit, so that a current is supplied to the light-emitting element EL according to the gate-source voltage Vgs of the driving element DT. At this time, the light-emitting element EL may emit light at a luminance corresponding to the grayscale of the pixel data.

The first and second EM pulses EM1 and EM2 may swing between the gate-on voltage VEH and the gate-off voltage VEL in order to enhance low grayscale expression in the light emission step Tem. The first and second EM pulses EM1 and EM2 may swing at a duty ratio set to a preset pulse width modulation (PWM) in the light emission step Tem.

The constant voltages ELVDD, ELVSS, Vinit, and Vref applied to the pixel circuit shown in FIG. 20 may be set as ELVDD>Vinit>Vref>ELVSS, but is not limited thereto. For example, the constant voltages may be set as ELVDD=12V, Vinit=1V, Vref=−4V, and EVSS=−6.

The light emitting element EL may be implemented as an OLED. The OLED used as the light-emitting element EL may be of a tandem structure in which a plurality of light-emitting layers are stacked. It is preferable that the reference voltage Vref is set to a voltage smaller than the turn-on voltage of the OLED, that is, Vref<(ELVSS+a voltage for turning on an OLED), so that black luminance does not increase.

Figure 23:
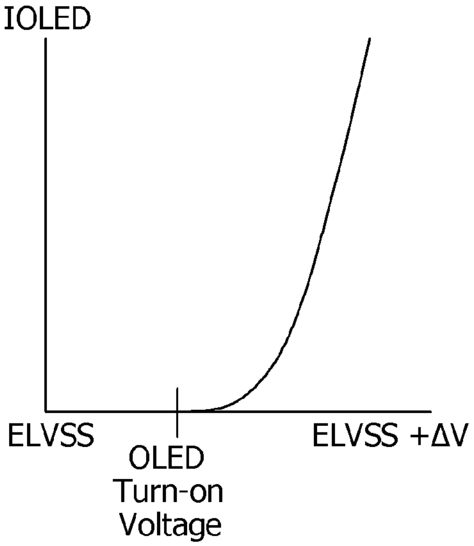
FIG. 23 is a diagram showing a turn-on voltage of an OLED and a current of the OLED.

FIG. 23 represents the turn-on voltage of the OLED and the current through the OLEDS after the turn on voltage is reached. In FIG. 23, the X-axis shows the turn-on voltage of the OLED greater than ELVSS and less than ELVSS+ΔV, and the Y-axis shows the current IOLED from the OLED when a voltage equal to or greater than the turn-on voltage is applied to the OLED.

When the voltage applied to the OLED is the turn-on voltage (or threshold voltage), a current is generated in the OLED, and as the voltage increases, the current flowing through the OLED increases. FIG. 23 is a characteristic of a typical OLED, and shows that the turn-on voltage of the OLED is greater than ELVSS and less than ELVSS+ΔV.

Figure 24:
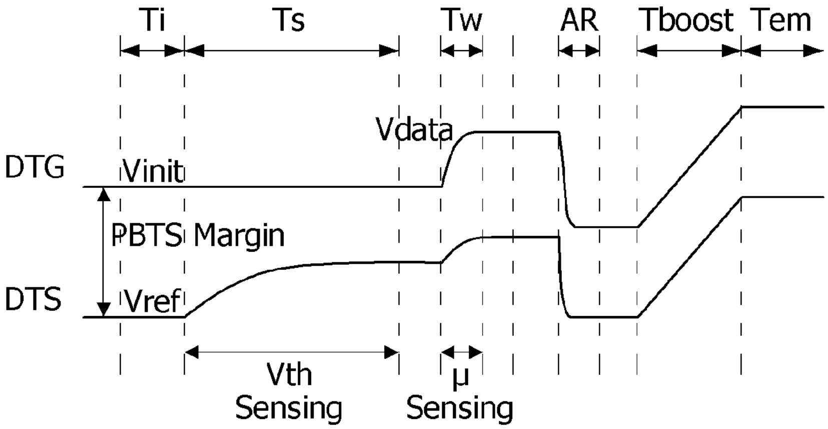
FIG. 24 is a diagram showing a positive-bias temperature stress (PBTS) margin of AV shown in FIG. 23.

In FIG. 23, 'ΔV' is a voltage difference between the initialization voltage Vinit and the reference voltage Vref. ΔV may be set in consideration of the positive-bias temperature stress (PBTS) margin shown in FIG. 24. The PBTS margin is secured in a voltage compensation range in consideration of the maximum amount that can be shifted when a threshold voltage of the driving element is shifted toward the positive polarity due to the PBTS. For example, when a threshold voltage Vth of the driving element DT is shifted to 5V, it may be set to Vref=Vinit−5V−PBTS margin (1V). The PBTS margin may be a minimum voltage deviation for performing a sensing operation on the threshold voltage of the driving element DT. When this PBTS margin is not secured, a sensing error may further increase as an amount of the shifted threshold voltage of the driving element DT increases.

The driving element DT generates a current according to the gate-source voltage Vgs to drive the light-emitting element EL. The driving element DT includes a first electrode connected to a first node n1, a gate electrode connected to a second node n2, and a second electrode connected to a third node n3.

The first capacitor Cst is connected between the second node n2 and the third node n3. The second capacitor C52 is connected between the third node n3 and the fifth node n5. A constant voltage DC is applied to the fifth node n5. The constant voltage DC may be any one of ELVDD, Vinit, and Vref.

The first switch element M51 is turned on according to the gate-on voltage VGH of the initialization pulse INIT in the initialization step Ti and the sensing step Ts and applies the initialization voltage Vinit to the second node n2. The first switch element M51 includes a first electrode connected to the third power line PL3 to which the initialization voltage Vinit is applied, a gate electrode connected to a first gate line GL1 to which the initialization pulse INIT is applied, and a second electrode connected to the second node n2.

The second switch element M52 is turned on according to the gate-on voltage VGH of the sensing pulse SENSE in the initialization step Ti and the sensing step Ts and connects the fourth node n4 to the fourth power line RL to which the reference voltage Vref is applied. The second switch element M52 includes a first electrode connected to the fourth node n4, a gate electrode connected to a second gate line GL2 to which the sensing pulse SENSE is applied, and a second electrode connected to the fourth power line RL.

The third switch element M53 is turned on according to the gate-on voltage VGH of the scan pulse SCAN synchronized with the data voltage Vdata in the data writing step Tw, and connects the data line DL to the first node n2. The data voltage Vdata is applied to the second node n2 in the data writing step Tw. The third switch element M53 includes a first electrode connected to the data line DL to which the data voltage Vdata is applied, a gate electrode connected to a third gate line GL3 to which the scan pulse SCAN is applied, and a second electrode connected to the second node n2.

The fourth switch element M54 is turned on according to the gate-on voltage VEH of the first EM pulse EM1 in the boosting step Tboost and the light emission step Tem, and connects the third node n3 to the fourth node n4. The fourth switch element M54 may be turned on according to the gate-on voltage VEH of the first EM pulse EM1 in the anode reset step of the low-speed driving mode. The fourth switch element M54 includes a first electrode connected to the third node n3, a gate electrode connected to a fourth gate line GL4 to which the first EM pulse EM1 is applied, and a second electrode connected to the fourth node n4.

The fifth switch element M55 is turned on according to the gate-on voltage VEH of the second EM pulse EM2, in the initialization step Ti, the sensing step Ts, the boosting step Tboost, and the light emission step Tem, and supplies the pixel driving voltage ELVDD to the first node n1. The fourth switch element M55 may be turned on according to the gate-on voltage VEH of the second EM pulse EM2 in the data writing step Tw. The fifth switch element M55 includes a first electrode connected to the first power line PL1 to which the pixel driving voltage ELVDD is applied, a gate electrode connected to a fifth gate line GL5 to which the second EM pulse EM2 is applied, and a second electrode connected to the first node n1.

The objects to be achieved by the present disclosure, the means for achieving the objects, and effects of the present disclosure described above do not specify essential features of the claims, and thus, the scope of the claims is not limited to the disclosure of the present disclosure.

According to one embodiment, a technique to achieve the desired goal is accomplished by providing an isolation switch element between a drive transistor and a light-emitting element being driven based on the data provided to the drive transistor. In particular, a selectively enabled isolation transistor is positioned between the output of the drive transistor and the anode of the light emitting diode that acts as isolation switch to electrically isolate the drive transistor from the light emitting diode during certain time periods of the circuit operation. This isolation transistor acts as an isolation switch to electrically isolate the second terminal of the drive transistor from the first terminal light emitting diode during the initialization time period of the circuit operation. It can also remain isolated during the sensing and data write time periods that follow the initialization time period. Electrically isolating these two terminals from each other during at least one of these time periods, and preferably during all three of the time periods prevents ripples in the ground voltage of the circuit and cross talk between other pixels in the circuit from affecting the light output voltage and thus lumens of the light emitting element.

According to one embodiment, a circuit is provided having a light emitting element that has a first terminal and second terminal. A drive transistor has a first terminal connected to receive a drive voltage, a gate terminal connected to receive a data voltage and a second terminal connected to selectively provide a light emitting drive voltage to the first terminal of the light emitting element. An isolation switch element positioned between the second terminal of the drive transistor and first terminal of light emitting element permits the second terminal of the drive transistor to be selectively coupled and uncoupled to the light emitting element at certain times. The isolation switch element has a first terminal connected to the second terminal of the drive transistor, a gate terminal connected to be selectively enable or disable the isolation switch element and a second terminal coupled to the first terminal of the light emitting element. A gate drive circuit 120 has an output coupled to the gate terminal of the isolation switch element to selectively enable or disable the connection of the second terminal of the drive transistor to the first terminal of the light emitting element.

According to one embodiment, the circuit also includes a sensing switching transistor having a first terminal electrically connected jointly to the first terminal light emitting element and the second terminal of the isolation switch element. Further, this sensing switching transistor has a first terminal electrically connected jointly to the second terminal of the drive transistor and to the first of the isolation switch element.

According to a further embodiment, a second isolation switch element is positioned between a source of the drive voltage and the first terminal of the drive transistor, the second isolation switch element has a first terminal electrically connected to the drive supply voltage source and a second terminal electrically connected to the first terminal of the drive transistor and a gate terminal connected to the gate drive circuit to selectively enable or disable the second isolation switch element.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure or claims. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit comprising:

a driving element comprising a first electrode electrically connected to a first node to which a pixel driving voltage is applied, a gate electrode electrically connected to a second node, and a second electrode electrically connected to a third node;

a light-emitting element comprising an anode electrode electrically connected to a fourth node and a cathode electrode to which a low-potential power supply voltage is applied;

a first switch element comprising a first electrode to which an initialization voltage is applied, a gate electrode to which an initialization pulse is applied, and a second electrode electrically connected to the second node, the first switch element is configured to supply the initialization voltage to the second node in response to the initialization pulse;

a second switch element comprising a first electrode electrically connected to the third node or the fourth node, a gate electrode to which a sensing pulse is applied, and a second electrode to which a reference voltage is applied, the second switch element is configured to supply the reference voltage to the third node or the fourth node in response to the sensing pulse;

a third switch element comprising a first electrode to which a data voltage is applied, a gate electrode to which a scan pulse is applied, and a second electrode electrically connected to the second node, the third switch element is configured to supply the data voltage to the second node in response to the scan pulse; and a fourth switch element comprising a first electrode electrically connected to the third node, a gate electrode to which a first emission control pulse is applied, and a second electrode electrically connected to the fourth node, the fourth switch element is configured to connect the third node to the fourth node in response to the first emission control pulse; wherein the fourth switch is disabled during a time period in which at least one of the first or second switch is enabled and is enabled during a time period when both of the first and second switches are disabled.

2. A pixel circuit comprising:

a driving element comprising a first electrode electrically connected to a first node to which a pixel driving voltage is configured to be applied, a gate electrode electrically connected to a second node, and a second electrode electrically connected to a third node;

a light-emitting element comprising an anode electrode electrically connected to a fourth node and a cathode electrode configured to receive a low-potential power supply voltage;

a first switch element comprising a first electrode to which an initialization voltage is configured to be applied, a gate electrode to which an initialization pulse is configured to be applied, and a second electrode electrically connected to the second node, the first switch element is configured to supply the initialization voltage to the second node in response to the initialization pulse;

a second switch element comprising a first electrode electrically connected to the third node or the fourth node, a gate electrode to which a sensing pulse is configured to be applied, and a second electrode to which a reference voltage configured to be applied, the second switch element is configured to supply the reference voltage to the third node or the fourth node in response to the sensing pulse;

a third switch element comprising a first electrode to which a data voltage is configured to be applied, a gate electrode to which a scan pulse is configured to be applied, and a second electrode electrically connected to the second node, the third switch element is configured to supply the data voltage to the second node in response to the scan pulse; and a fourth switch element comprising a first electrode electrically connected to the third node, a gate electrode to which a first emission control pulse is configured to be applied, and a second electrode electrically connected to the fourth node, the fourth switch element is configured to connect the third node to the fourth node in response to the first emission control pulse;

a first capacitor electrically connected between the second node and the third node; and a second capacitor electrically connected between the third node and a node to which a constant voltage is configured to be applied, wherein the constant voltage is one of the pixel driving voltage, the initialization voltage, or the reference voltage.

3. The pixel circuit of claim 1, wherein the initialization voltage is lower than the pixel driving voltage and higher than the low-potential power supply voltage, and the reference voltage is lower or higher than the low-potential power supply voltage.

4. The pixel circuit of claim 1, further including:

a fifth switch element comprising a first electrode electrically connected to a power line to which the pixel driving voltage is applied, a gate electrode to which a second emission control pulse is applied, and a second electrode electrically connected to the first node, the fifth switch element is configured to connect the power line to the first node in response to the second emission control pulse, wherein the driving element comprises an oxide thin film transistor.

5. The pixel circuit of claim 4, wherein the pixel circuit is driven in the order of an initialization step, a sensing step, a data writing step, a boosting step, and a light emission step, in the initialization step, voltages of the initialization pulse, the first emission control pulse, the second emission control pulse, and the sensing pulse are a gate-on voltage, and the voltage of the scan pulse is a gate-off voltage, in the sensing step, the voltages of the initialization pulse, the sensing pulse, and the second emission control pulse are the gate-on voltage, and the voltages of the scan pulse and the first light emission control pulse are the gate-off voltage, in the data writing step, the voltages of the scan pulse and the sensing pulse are the gate-on voltage, and the voltages of the initialization pulse and the first light emission control pulse are the gate-off voltage, in the data writing step, the voltages of the second emission control pulse is the gate-on voltage or the gate-off voltage, in the boosting step and the light emission step, the voltages of the first and second light emission control pulses are the gate-on voltage, and the voltages of the initialization pulse, the sensing pulse, and the scan pulse are the gate-off voltage, in the boosting step, the voltages of the second and third nodes rise, and the first to fifth switch elements are turned on according to the gate-on voltage and turned off according to the gate-off voltage.

6. The pixel circuit of claim 5, wherein an anode reset step is set between the data writing step and the boosting step, in the anode reset step, the voltages of the first emission control pulse and the sensing pulse are the gate-on voltage, and the voltages of the second emission control pulse, the initialization pulse, and the scan pulse are the gate-off voltage.

7. A display device comprising:

a display panel on which a plurality of data lines, a plurality of gate lines overlapping the data lines, a plurality of power lines to which different constant voltages are applied, and a plurality of subpixels are disposed;

a data driver configured to supply a data voltage of pixel data to the data lines; and a gate driver configured to supply an initialization pulse, a sensing pulse, a scan pulse, and an emission control pulse to the gate lines, wherein each of the subpixels comprises:

a driving element comprising a first electrode electrically connected to a first node to which a pixel driving voltage is applied, a gate electrode electrically connected to a second node, and a second electrode electrically connected to a third node;

a light-emitting element comprising an anode electrode electrically connected to a fourth node and a cathode electrode to which a low-potential power supply voltage is applied;

a first switch element comprising a first electrode to which an initialization voltage is applied, a gate electrode to which the initialization pulse is applied, and a second electrode electrically connected to the second node, and configured to supply the initialization voltage to the second node in response to the initialization pulse;

a second switch element comprising a first electrode electrically connected to the third node or the fourth node, a gate electrode to which the sensing pulse is applied, and a second electrode to which a reference voltage is applied, and configured to supply the reference voltage to the third node or the fourth node in response to the sensing pulse;

a third switch element comprising a first electrode to which the data voltage is applied, a gate electrode to which the scan pulse is applied, and a second electrode electrically connected to the second node, and configured to supply the data voltage to the second node in response to the scan pulse; and a fourth switch element comprising a first electrode electrically connected to the third node, a gate electrode to which the emission control pulse is applied, and a second electrode electrically connected to the fourth node, and configured to connect the third node to the fourth node in response to the emission control pulse, wherein the fourth switch is disabled during a time period in which at least one of the first or second switch is enabled and is enabled during a time period when both of the first and second switches are disabled.

8. A method of driving a light emitting element comprising:

providing a high voltage to a first terminal of a drive transistor at the same time that an initialization voltage is provided to a gate of the drive transistor during a first time period;

electrically isolating a first terminal of the light emitting element from a second terminal of the drive transistor during the first time period;

providing a data signal that contains light emission data to a gate of the drive transistor during a second time period;

maintaining the first terminal of the light emitting element being electrically isolated from the second terminal of the drive transistor during the second time period;

providing a sense signal to a gate of a sense switching transistor during both the first and the second time periods, the sense switching transistor having a first terminal electrically connected to the first terminal of the light emitting element;

boosting the voltage on the gate of the drive transistor during a third time period;

electrically connecting the first terminal of the light emitting element to the second terminal of the drive transistor during the third time period; and emitting light from the light emitting element during a fourth time period.

9. The method of claim 8 further including:

electrically connecting the second terminal of the drive transistor to the first terminal of the light emitting element during an initialization time period that is prior to the first time period.

10. The method of claim 8 further including:

electrically isolating the first terminal of the drive transistor from the high voltage during the second time period.

* * * * *